US011032160B1

(12) United States Patent
Raheja

(10) Patent No.: US 11,032,160 B1
(45) Date of Patent: Jun. 8, 2021

(54) SERVERLESS ELASTIC SCALE API GATEWAY MANAGEMENT SYSTEM AND METHOD OF AN API SERVICE CONTROL PLANE SYSTEM

(71) Applicant: BOOMI, INC., Round Rock, TX (US)

(72) Inventor: Rajesh Raheja, Cupertino, CA (US)

(73) Assignee: BOOMI, INC., Round Rock, TX (US)

( * ) Notice: Subject to any disclaimer, the term of this patent is extended or adjusted under 35 U.S.C. 154(b) by 0 days.

(21) Appl. No.: 16/944,678

(22) Filed: Jul. 31, 2020

(51) Int. Cl.
*H04L 12/24* (2006.01)
*H04L 12/66* (2006.01)
*H04L 29/06* (2006.01)

(52) U.S. Cl.
CPC .......... *H04L 41/5009* (2013.01); *H04L 12/66* (2013.01); *H04L 41/0803* (2013.01); *H04L 67/40* (2013.01)

(58) Field of Classification Search
CPC ............. H04L 41/0803; H04L 41/5009; H04L 41/5012; H04L 41/5019; H04L 41/5025; H04L 63/10
See application file for complete search history.

(56) References Cited

U.S. PATENT DOCUMENTS

| | | | | |
|---|---|---|---|---|
| 8,261,295 | B1 * | 9/2012 | Risbood | G06F 9/5072 719/328 |
| 9,716,617 | B1 * | 7/2017 | Ahuja | H04L 63/0227 |
| 10,678,925 | B2 * | 6/2020 | Bruso | G06F 21/554 |
| 2016/0057107 | A1 * | 2/2016 | Call | H04L 63/0236 726/11 |
| 2016/0092297 | A1 * | 3/2016 | Mazon | G06F 11/0793 714/15 |
| 2019/0149424 | A1 * | 5/2019 | O'Neill | G06F 11/3428 709/224 |
| 2019/0213326 | A1 * | 7/2019 | Dykes | G06F 21/552 |
| 2019/0227856 | A1 * | 7/2019 | Xu | G06F 9/541 |
| 2020/0366572 | A1 * | 11/2020 | Chauhan | H04L 41/5032 |
| 2020/0366697 | A1 * | 11/2020 | Vittal | H04L 63/10 |
| 2020/0374365 | A1 * | 11/2020 | Gandhi | H04L 63/0236 |

\* cited by examiner

*Primary Examiner* — Shean Tokuta
(74) *Attorney, Agent, or Firm* — Prol Intellectual Property Law, PLLC; H. Kenneth Prol

(57) ABSTRACT

An information handling system operating a serverless elastic-scale application programming interface (API) gateway management system may comprise a network interface device receiving gateway operation policies, in a first format, for execution of an API at a gateway, and a processor generating a gateway configuration file, in a second format, via one of a plurality of gateway type policy translators, instructing the gateway to provision the API to meet the gateway operation policies. The information handling system may also comprise a network interface device to transmit the gateway configuration file to the gateway and receive an indication that an API call was made at the gateway, and a service level agreement (SLA) monitor to determine a call rate at which API calls are made at the gateway exceeds a preset rate limit defined within the operation policies, and transmit an instruction to the gateway to reject the API call.

20 Claims, 6 Drawing Sheets

SERVERLESS ELASTIC SCALE API GATEWAY MANAGEMENT SYSTEM AND METHOD OF AN API SERVICE CONTROL PLANE SYSTEM

CROSS REFERENCE TO RELATED APPLICATIONS #

This application is a related to U.S. application Ser. No. 16/944,781, filed Jul. 31, 2020, entitled "SYSTEM AND METHOD FOR MULTI-CLOUD GATEWAY CONFIGURATION WITHIN API SERVICE CONTROL PLANE," invented by Rajesh Raheja et al., and assigned to the assignee hereof.

FIELD OF THE DISCLOSURE

The present disclosure relates generally to a system and method for life-cycle management of a deployed application programming interface (API). More specifically, the present disclosure relates to adaptively monitoring API performance and re-configuring deployment of the API across multiple gateways of different types to optimize performance of the API.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), a head-mounted display device, server (e.g., blade server or rack server), a network storage device, a network storage device, a switch router or other network communication device, other consumer electronic devices, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. Further, the information handling system may include telecommunication, network communication, and video communication capabilities and require communication among a variety of data formats.

BRIEF DESCRIPTION OF THE DRAWINGS

The present disclosure will now be described by way of example with reference to the following drawings in which.

The use of the same reference symbols in different drawings may indicate similar or identical items.

DETAILED DESCRIPTION

Figure 1:
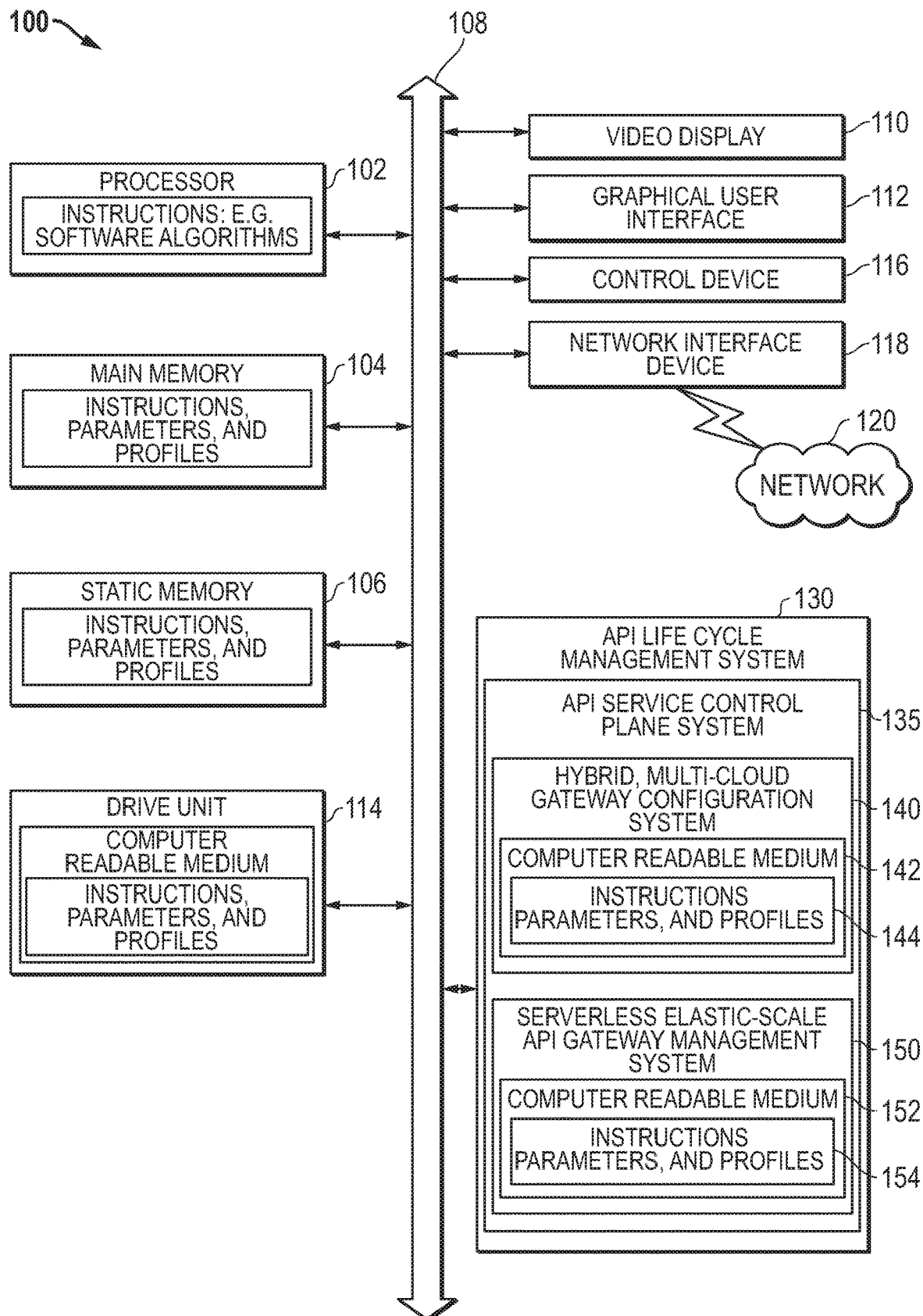
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Current methods of transacting business between or among a plurality of business entities involve the use of multiple software applications, application programming interfaces (APIs), or integration processes to transfer shared data among the plurality of businesses or customers. The information technology (IT) industry has moved toward the use of APIs to facilitate communications between a backend application managing data an external agent wishes to access and the external agent requesting such access. An external agent in such an example scenario may be another application managed by a separate entity than the entity managing the backend application. APIs have traditionally operated to authenticate the credentials of the external agent (e.g., authentication), apply and enforce security measures, and limit the number of calls a given external agent may make to the backend application (e.g., rate limiting), among other tasks. In such a way, an API may protect the backend application from unsecure requests and perform rudimentary traffic management services.

Design, development, testing, and maintenance for APIs have traditionally been performed by several entities, using several different types of infrastructure in previous systems. For example, APIs initially were generated by the same entity that developed the backend application that it served. However, a separate market for API developers that design APIs for several different backend applications has developed. In addition, APIs were initially executed on the same server as the backend application, or on servers located within a local area network (LAN) that also included the server executing the backend application. However, with the rise of cloud computing, execution of the APIs has shifted toward deployment at gateways located in the cloud, remotely from the servers executing the backend applications. In order to streamline each of these separate tasks or life stages of an API, Dell® Boomi® has developed the API lifecycle management system. The API lifecycle management system allows an API product manager to design, build, test, deploy, and perform maintenance on an API, supporting the full lifecycle of the API. An API product manager may use the API service control plane system in embodiments of the present disclosure with its multiple systems for streamlining configuration, deployment, monitoring, and reconfiguration of multiple types of non-compatible gateways to accommodate high-level gateway operation policies set by the API Product Manager, without requiring that user to understand the underlying configuration or infrastructure of a given gateway. API product manager may then fulfill essential business outcomes easily with less interface required from various IT professionals with particularized roles in development and deployment of APIs. With the advent of internet and cloud computing, many APIs and API types may need to be developed and released for enterprises conducting business across such a variety of interconnected platforms. Thus, having a system according to embodiments of the present disclosure with a dynamic and simplified system for customizing and deployment of a variety of possible APIs is valuable to an API product manager without the need to access specialized types of IT professionals to participate in the various steps of API development and deployment. The API lifecycle management system may operate to build and deploy the executable code instructions to a server where the API will be executed in the future.

The rise of cloud computing has resulted in APIs being executed at policy enforcement points which are often times located remotely from and connected via a network (e.g., LAN or the internet) to the backend applications the APIs serve. Policy enforcement points may be referred to as gateways herein and may include dedicated API gateways or other specialized servers where these policies are encoded. While an API may perform rudimentary traffic management of calls being handled by the backend application (e.g., by only transmitting calls by authenticated external agents and limiting the number of calls made by any one agent), the API does not manage traffic of calls incoming at the gateway, to the API itself. In previous systems, an IT professional would manage such traffic at the gateway. A typical IT professional in this context would include an API/System Administrator, DevOps Engineer, Enterprise Architect, API Developer, or an Integration Process Developer. This would involve the IT professional first configuring the gateway to execute the API code instructions at one or more computing nodes within the gateway and defined by a resource path or other address. Such configuration may be achieved by instructing the gateway to operate according to a configuration file. This configuration may take place prior to execution of the API at the gateway. Upon such an execution of the API at the gateway, the IT professional in previous systems may monitor traffic at the gateway to determine whether more computing nodes need to be dedicated to processing received API calls. This may result from a high level of traffic being routed to the nodes that are currently executing the API, indicating more nodes are needed to distribute the traffic more evenly and efficiently. In such a scenario, the IT professional must constantly monitor such traffic, then reconfigure the gateway to provide greater or fewer nodes to handle current traffic conditions. This places a high burden on the IT professional.

In order to decrease this burden on IT professionals, several different types of gateway architectures were developed to handle some of these traffic monitoring and load balancing tasks automatically. Many gateways were developed with integrated load balancing capabilities that automatically provision greater or fewer nodes within a single gateway, based on monitored traffic of API calls. However, each such gateway may only monitor traffic at that gateway, and may only provision greater or fewer nodes within that gateway. If the API is being executed across multiple gateways, one gateway may be experiencing very high traffic, while the other is experiencing very low traffic. The load balancing capabilities integrated within a single gateway cannot direct traffic away from the gateway experiencing high traffic and toward the gateway experiencing low traffic in such a scenario, because the load balancing capabilities are limited to the internal workings of each individual gateway.

One approach to handling these issues includes running the API as a conglomeration of microservices, with each microservice performing a subset of the functionality of the API as a whole. For example, an API may be developed to respond to purchase orders received via an online marketplace. The full API may operate to retrieve the number of available items for sale from an inventory repository, transmit a purchaser's request for shipment of a specific item to a fulfillment center, and transmit the purchaser's billing information to an accounting platform. One way to distribute the workload performed by such a fully-integrated API may be to separate these three tasks, and have one microservice perform each of the three tasks. Each microservice may also be provisioned to execute at a separate node within the gateway. Thus, instead of all API calls to the inventory repository, fulfillment center, and accounting platform being routed through a single node executing a fully-integrated API serving all of these requests, a first node may route calls to the inventory repository, a second node may route calls to the fulfillment center, and a third node may route calls to the accounting platform. Further, APIs using a microservices architecture may add new functionalities by adding microservices compatible with existing microservices, rather than overhauling the entire code instruction of the integrated API and shutting down all services to reboot the monolithic code instructions for the integrated API.

Microservices in such systems may communicate with one another. For instance, a microservice handling calls to an accounting platform or banking platform may ensure the online marketplace customer's payment is successful, then transmit an authorization to the microservice handling calls to the fulfillment center indicating the fulfillment center should process the customer's shipping request. This is only one example of intra-API microservice communication. APIs may perform routing between applications performing any number of functionalities in any number of industries. The number of calls between microservices may be considerable, and may cause internal traffic at a gateway running several microservices. Some gateways have been developed to optimize this internal traffic by employing a service mesh layer that monitors and manages such traffic between various nodes running microservices at a gateway. Gateways that are embedded within such service mesh layers (e.g., mesh gateways) are configured differently than gateways that do not employ these service meshes. Thus, the configuration files for mesh gateways require different syntax and formatting than configuration files for traditional, or non-mesh gateways.

Several other performance enhancing methods for APIs have also been developed. For example, some APIs are built using a "canary" method in which some microservices are initially released on a limited basis (e.g., allowing very low traffic to the node operating the microservice). This allows API developers to test functionality of this microservice on a limited basis, such that any bugs in the microservice code instructions have a very small impact on other related microservices (e.g., monitoring the canary in the coal mine). As another example, some APIs are deployed using a red/black or blue/green model, in which the new microservice is initially deployed in two different nodes or resource paths. In such systems, the traffic routed to these two different nodes may be adjusted or redistributed as necessary to optimize the totality of traffic between both nodes. Each of these solutions may affect the configuration of the gateway executing these microservices, and different types of gateways may support different types of these solutions. For example, some gateways may support canary deployment, but not red/black deployment. In other cases, multiple gateways may support canary deployment, but each gateway type capable of performing such a deployment may require configuration files having different syntax or format.

Existing systems require an IT professional to write each of these configuration files prior to deployment of the API or microservices and after deployment of services, they may need to continuously monitor and dynamically configure, based on high-level performance requirements, often set by a business professional not familiar with gateway architecture. For example, IT professionals may receive a Service Level Agreement (SLA) from a business professional, indicating a node availability requirement. Such a node availability requirement may dictate, for example, that the node executing a microservice (or an entire API) must be available to handle calls to that microservice or API 95% of the time. The IT professional in existing systems may then select an appropriate type of gateway (e.g., a gateway that provides automated load-balancing services) then write a configuration file compatible with that chosen gateway type that instructs the load-balancing service to provision new nodes to ensure this 95% availability requirement is met.

This is only one example of a high-level gateway operation requirement that must be translated by an IT professional into a configuration file compatible with a chosen type of gateway. In other examples, the IT professional may receive several gateway operation requirements that cause the IT professional to choose a more complex gateway type (e.g., one providing service mesh layer capabilities, or that supports one or more of canary or red/black deployment models). This may require the IT professional to learn how to write configuration files for several different types of gateways and learn how to dynamically configure detailed execution of these gateways, potentially slowing down deployment of the API or each new microservice. Further, these high-level gateway operation policies may change over time. One example of such a change may include increasing the required availability to accommodate a burst scenario (e.g., black Friday purchase orders). In existing systems, an IT professional responds to such changes in high-level gateway operation policies by writing a new configuration file to accommodate the change, then temporarily shutting down the gateway in order to implement the new configuration. This may cause the API and all associated microservices operating at that gateway to be temporarily unavailable due to maintenance. Moreover, backend service providers may utilize any of a variety of API policy enforcement platform types. Thus, a plurality of gateway types may be used to enforce API policies. A system is needed to automate the translation of these high-level gateway performance requirements into configuration files compatible with any number of gateway types, and automate maintenance of these configuration files.

Embodiments of the present disclosure address these issues by providing an API service control plane system capable of monitoring, configuring, and reconfiguring multiple gateways of various types that may not be capable of communicating with or managing one another. Some embodiments of the present disclosure address these issues by automatically translating high-level gateway performance requirements to variously formatted configuration files via a hybrid, multi-cloud gateway configuration system. This obviates the need for an IT professional to learn the proper syntax, formatting, and infrastructure of a given gateway type and the API policy enforcement platform or runtime service mesh controller used there. Embodiments of the present disclosure provides the API product manager to fulfill essential business outcomes easily. Further, because the hybrid, multi-cloud gateway configuration system automatically translates the high-level gateway operation requirements to any number of configuration files with ease, the API or various microservices may be deployed easily across different types of gateways, providing much greater flexibility in choice of gateway type for deployment. In addition, microservices for a single API may be distributed across two different gateways, each of a different type. This allows API developers to test in real-time, which of the types of gateways handles traffic for a given microservice best.

Other embodiments of the present disclosure address these issues by monitoring traffic across multiple gateways of varying types via a serverless elastic-scale API gateway management system. Such a system may also update these variously formatted configuration files as necessary to continuously meet the high-level gateway performance requirements. In such embodiments, the serverless elastic-scale API gateway management system may obviate the need for an IT professional to constantly monitor traffic at a gateway to ensure the gateway performance requirements are met, or to update configuration files to do so.

Further, the serverless elastic-scale API gateway management system may monitor traffic across multiple different types of gateways that are not capable of communicating with or managing one another. The serverless elastic-scale API gateway management system goes further in alleviating the tasks of an API Product Manager by abstracting the underlying complexities in deploying and maintaining high performance systems typically needed in large enterprises where substantial efforts may be involved with development and deployment of APIs. As described above, the API service control plane system allows microservices for a single API, or multiple instances of a single API to be distributed across two different gateways, of the same or different types. This allows API developers to test in real-time, which of these gateways most effectively meets the high-level gateway policies incorporated within the gateway configuration files executed at these gateways. The serverless elastic-scale API gateway management system in embodiments described herein may monitor the abilities of each of these different gateways to meet these high-level gateway policies, and may provision greater or fewer instances of the API or various microservices among these various gateways in order to ensure all high-level gateway operation requirements are consistently met. Thus, the API service control plane system in embodiments of the present disclosure provides multiple systems for streamlining configuration, deployment, monitoring, and reconfiguration of multiple types of non-compatible gateways to accommodate high-level gateway operation policies set by a user, such as the API Product Manager, without requiring that user to understand the underlying configuration or infrastructure of a given gateway.

FIG. 1 is a block diagram illustrating an information handling system, according to an embodiment of the present disclosure. Information handling system 100 can include processing resources for executing machine-executable code, such as a central processing unit (CPU), a programmable logic array (PLA), an embedded device such as a System-on-a-Chip (SoC), or other control logic hardware used in an information handling system several examples of which are described herein. Information handling system 100 can also include one or more computer-readable media for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

FIG. 1 illustrates an information handling system 100 similar to information handling systems according to several aspects of the present disclosure. For example, an information handling system 100 may be any mobile or other computing device capable of executing a set of instructions (sequential or otherwise) that specify actions to be taken by that machine. In a particular embodiment, the information handling system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets, of instructions to perform one or more computer functions.

Information handling system 100 can include devices or modules that embody one or more of the devices or execute instructions for the one or more systems and modules herein, and operates to perform one or more of the methods. The information handling system 100 may execute code instructions 144 for the hybrid, multi-cloud gateway configuration system 140, code instructions for the API life cycle management system 130, or the API service control plane system 135 that may operate on servers or systems, remote data centers, or on-box in individual client information handling systems such as a local display device, or a remote display device, according to various embodiments herein. In some embodiments, it is understood any or all portions of code instructions 144 for the hybrid, multi-cloud gateway configuration system 140, code instructions 154 for the serverless elastic-scale API gateway management system 150, or code instructions of the API life cycle management system 130, or the API service control plan 135 may operate on a plurality of information handling systems 100.

The information handling system 100 may include a processor 102 such as a central processing unit (CPU), a graphics-processing unit (GPU), control logic or some combination of the same. Any of the processing resources may operate to execute code that is either firmware or software code. Moreover, the information handling system 100 can include memory such as main memory 104, static memory 106, drive unit 114, for storing or operating with the computer readable medium 142 of the API service control plane for the hybrid, multi-cloud gateway configuration system 140, or the API life cycle management system 130 (volatile (e.g. random-access memory, etc.), nonvolatile (read-only memory, flash memory etc.) or any combination thereof). The information handling system 100 can also include memory such as main memory 104, static memory 106, drive unit 114, for storing or operating with the computer readable medium 152 of the serverless elastic-scale API gateway management system 150, or the API life cycle management system 130. The information handling system 100 can also include one or more buses 108 operable to transmit communications between the various hardware components such as any combination of various input and output (I/O) devices. Portions of an information handling system may themselves be considered information handling systems.

As shown, the information handling system 100 may further include a video display 110, such as a liquid crystal display (LCD), an organic light emitting diode (OLED), a flat panel display, a solid state display, or other display device. Additionally, the information handling system 100 may include a control device 116, such as an alpha numeric control device, a keyboard, a mouse, touchpad, camera, fingerprint scanner, retinal scanner, face recognition device, voice recognition device, gesture or touch screen input, or other input/output device. The information handling system 100 may further include a graphical user interface 112 that may be displayed in a video display 110.

The information handling system 100 can represent a server device whose resources can be shared by multiple client devices, or it can represent an individual client device, such as a desktop personal computer, a laptop computer, a tablet computer, or a mobile phone. In a networked deployment, the information handling system 100 may operate in the capacity of a server or as a client user computer in a server-client user network environment, or as a peer computer system in a peer-to-peer (or distributed) network environment.

The information handling system 100 can include a set of instructions that can be executed to cause the computer system to perform any one or more of the methods or computer based functions disclosed herein. For example, information handling system 100 includes an operating system (OS) such as Windows OS, Android OS, or other operating systems, one or more application programs, and a Basic Input/Output System and Firmware (BIOS/FW) code. The OS functions to execute one or more application programs described herein, and the BIOS/FW code (e.g., within 144 or 154) functions to initialize information handling system 100 on power up, to launch an OS, and to manage input and output interactions between the operating system and the other elements of information handling system 100.

In a particular embodiment, the BIOS/FW code and OS may reside in memory 104, and include machine-executable code that is executed by processor 102 to perform various functions of information handling system 100. In another embodiment (not illustrated), application programs and BIOS/FW code may reside in another storage medium of information handling system 100. For example, application programs and BIOS/FW code can reside in static memory 106, drive 114, in a ROM (not illustrated) associated with information handling system 100 or other memory. Other options include OS, application programs and BIOS/FW code sourced from remote locations, for example via a hypervisor or other system, that may be associated with various devices of information handling system 100 partially in memory 104, storage system 106, drive unit 114 or in a storage system (not illustrated) associated with network interface device 118 or any combination thereof. Application programs and BIOS/FW code can each be implemented as single programs, or as separate programs carrying out the various features as described herein. Application program interfaces (APIs) such as WinAPIs (e.g. Win32, Win32s, Win64, and WinCE), proprietary APIs (e.g., for SalesForce® or Oracle's® NetSuite®), or an API adhering to a known open source specification (e.g., Swagger™) may enable application programs to interact or integrate operations with one another. Application programs can include code instructions 144 and 154 for 140 and 150, respectively.

In an example of the present disclosure, instructions 144 may execute software for automating translation of high-level gateway operation requirements or policies into a plurality of configuration files, each adhering to a different syntax or format compatible with a different type of gateway device. In another embodiment, instructions 154 may execute software for monitoring performance at one or more gateways, and automatically reconfiguring such gateways to ensure high-level gateway operation policies are continuously met, even as these policies change over time. The API life cycle management system 130 in an embodiment may operate to receive high-level gateway operation policies for a given API from a business or information technology (IT) professional user, and manage dissemination of all metadata associated that API, including high-level gateway operation policies to applications 140 and 150 as appropriate. The computer system 100 may operate as a standalone device or may be connected, such as via a network, to other computer systems or peripheral devices.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. Software applications may be stored in main memory 104, static memory 106, such as the API service control plane 135 for the hybrid, multi-cloud gateway configuration system 140, the serverless elastic-scale API gateway management system 150, or the API life cycle management system 130.

The disk drive unit 114, and the hybrid, multi-cloud gateway configuration system 140, or the API life cycle management system 130 may include a computer-readable medium 142 such as a magnetic disk, or a solid-state disk in an example embodiment. The computer-readable medium of the disk drive 114 may store the API service control plane for the hybrid, multi-cloud gateway configuration system 140, the serverless elastic-scale API gateway management system 150, or the API life cycle management system 130 corresponding to the present disclosure.

Network interface device 118 represents a wired or wireless network interface circuit disposed within information handling system 100, on a main circuit board of the information handling system, integrated onto another component such as processor 102, in another suitable location, or a combination thereof. The network interface device 118 can include another information handling system, a data storage system, another network, a grid management system, another suitable resource, or a combination thereof, and may communicate via a wired connection or wirelessly.

The API service control plane 135 for the hybrid, multi-cloud gateway configuration system 140, or the API life cycle management system 130 may also contain computer readable medium 142. The serverless elastic-scale API gateway management system 150, or the API life cycle management system 130 may also contain computer readable medium 152. While the computer-readable media 142 and 152 are shown to each be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include the API service control plane system 135 for the hybrid, multi-cloud gateway configuration system 140, and the serverless elastic-scale API gateway management system 150, or the API life cycle management system 130, which may be operably connected to one or more buses 108. The API service control plane system 135 for the hybrid, multi-cloud gateway configuration system 140 and the serverless elastic-scale API gateway management system 150 are discussed in greater detail herein below.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a standalone device). The system, device, or module can include software, including firmware embedded at a device, such as an Intel® Core class processor, ARM® brand processors, Qualcomm® Snapdragon processors, or other processors and chipset, or other such device, or software capable of operating a relevant environment of the information handling system. The system, device or module can also include a combination of the foregoing examples of hardware or software. In an example embodiment, the hybrid, multi-cloud gateway configuration system 140, the serverless elastic-scale API gateway management system 150, or the API life cycle management system 130 and the several modules described in the present disclosure may be embodied as hardware, software, firmware or some combination of the same. Note that an information handling system can include an integrated circuit or a board-level product having portions thereof that can also be any combination of hardware and software. Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Figure 2:
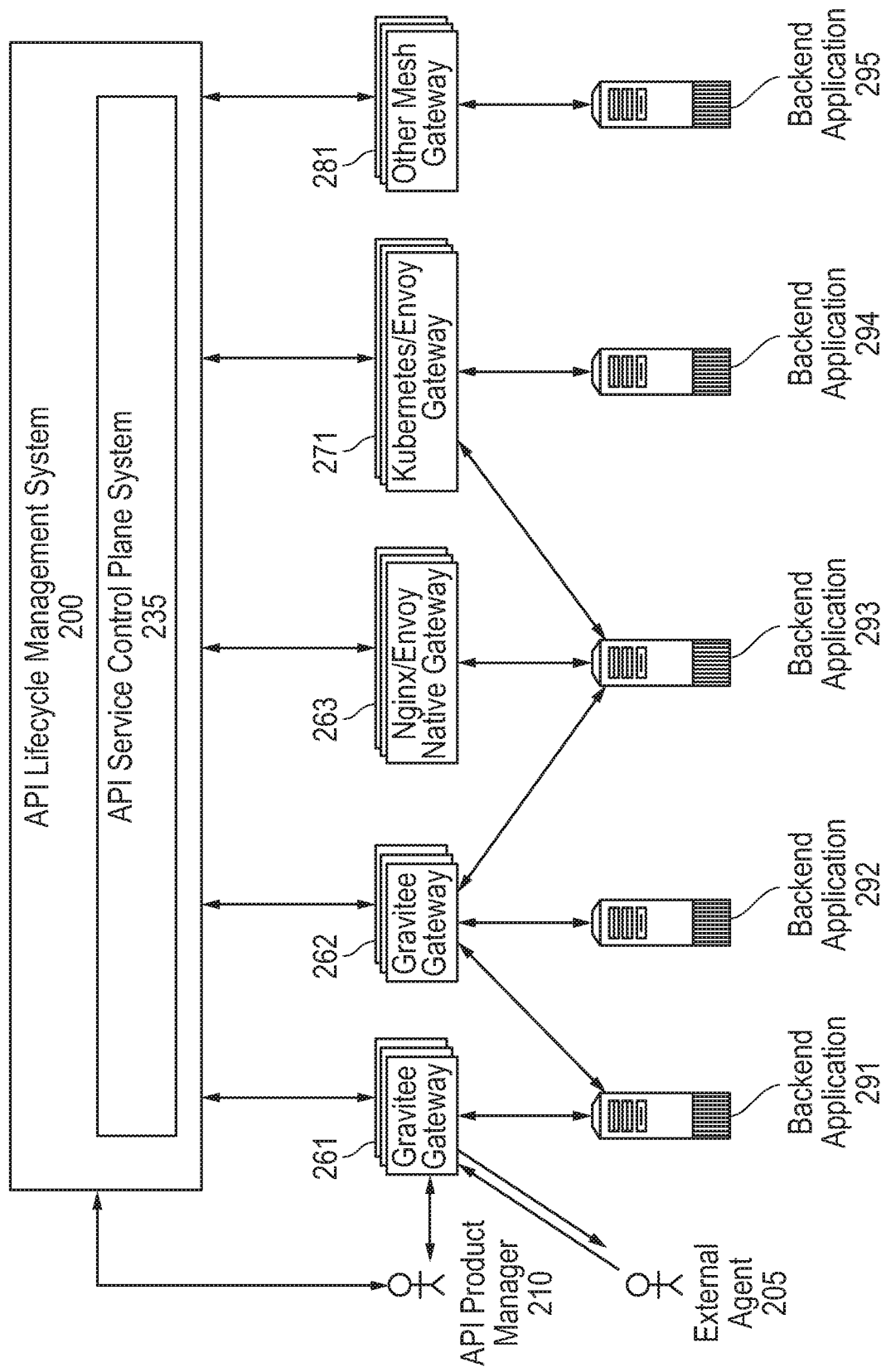
FIG. 2 is a graphical diagram illustrating an API lifecycle management system according to the present disclosure.

FIG. 2 is a graphical diagram illustrating an API lifecycle management system 230 in communication with a plurality of gateways of varying types and capabilities according to the present disclosure. As described herein, the information technology (IT) industry has moved toward the use of APIs to facilitate communications between a backend application managing data an external agent wishes to access and the external agent requesting such access. As also described herein, the rise of cloud computing has resulted in APIs being executed at gateways which are often times located remotely and connected via a network (e.g., LAN or the internet) to the backend applications the APIs serve.

For example, an API may be deployed by an API product manager 210 at one or more gateways, such as a Gravitee® gateway 261, a Gravitee® gateway 262, an Nginx®/Envoy® Native gateway 263, Kubernetes®/Envoy® service mesh embedded gateway 271, or another type of currently available or later developed mesh-compliant gateway 281. In embodiments herein, a Kubernetes®/Envoy® service mesh embedded gateway 271 and the other mesh-compliant gateway are a type of service mesh embedded gateway. Such mesh-compliant gateways may be referred to as simply gateways as well but are understood to be service mesh embedded gateways as compared to dedicated API gateways.

The Gravitee® gateways 261 and 262 and the Nginx®/Envoy® Native gateway 263 in such an embodiment may operate without a mesh service layer, while the Kubernetes®/Envoy® service mesh embedded gateway 271 and other service mesh embedded gateway 281 operate in tandem with a mesh service layer. Additional examples of other mesh gateway 281 options may include one or more proxy or gateway systems with an underlying orchestration technology or container technology for the gateway. For example, additional options for the other mesh gateway 281 may include any combinations of Envoy®, Nginx HAProxy®, Netflix OSS®, Consul®, or Gravitee® proxies or gateways with any of Kubernetes®, Mesosphere®, Cloud Foundry®, OpenShift®, or the Boomi® Atom/Molecule as the underlying orchestration or container technology of the gateway. Thus, the system of embodiments of the present disclosure enable open and neutral API development and deployment that can interact with any information system. Further, the API product manager 210 may be agnostic as to the type of API implementation as well as shielded from some of the complexity of implementing APIs.

The API in an embodiment may be provisioned at any one of these gateways 261, 262, 263, 271, or 281, across multiple of these gateways simultaneously, or partially provisioned across multiple of these gateways. The API product manager 210 may be in communication, via an API service control plane 235 as part of an API lifecycle management system 230 with any one of or each of these gateways 261, 262, 263, 271, or 281 as necessary to transmit the API executable code instructions to one or more of these gateways. Such transmission or deployment of the API executable code instructions in an embodiment may be referred to herein as provisioning the API. In some embodiments, portions of the API, referred to herein as microservices, may be deployed separately from other portions. These separate deployments may be separated by time, or may be deployed to separate locations (e.g., two different nodes within the same gateway, or to two separate gateways), via API service control plane 235.

The API or portions thereof operating at any one of the gateways 261, 262, 263, 271, or 281 may operate to facilitate communications between a backend application managing data an external agent wishes to access and the external agent requesting such access. For example, an external agent 205 may wish to access information or data stored at or managed by backend application 291. An API provisioned at the Gravitee® gateway 262 in such an example embodiment may receive an API call requesting such data from the external agent 205, and ensure the external agent 205 has proper credentials and has not exceeded its API call rate limit. Once the API at gateway 261 has determined the external agent 205 is authorized to request such data, it may communicate with the backend application 291 managing such data to retrieve the requested data. The gateway 261 in such an example embodiment may then transmit the response to the received API call to the external agent 205.

In some embodiments, a single gateway may execute a plurality of APIs, each serving a different backend application. For example, the Gravitee® gateway 262 in an embodiment may execute a first API controlling communication with backend application 291, a second API controlling communication with backend application 292, and a third API controlling communication with backend application 293. In another aspect of embodiments, multiple APIs may operate to control communications with a single backend application. For example, a first API executing the Gravitee® gateway 262, a second API executing at the Nginx®/Envoy® gateway 263, and a third API operating at the Kubernetes®/Envoy® service mesh embedded gateway 271 may all control communications with the same backend application 293.

Design, development, testing, and maintenance for APIs deployed in such a manner have been performed by several entities, using several different types of infrastructure in previous systems. For example, APIs initially were generated by the same entity that developed the backend application that it served. However, a separate market for API developers that design APIs for several different backend applications has developed. In addition, APIs were initially executed on the same server as the backend application, or on servers located within a local area network (LAN) that also included the server executing the backend application. However, with the rise of cloud computing, execution of the APIs has shifted toward deployment at gateways located in the cloud, remotely from the servers executing the backend applications. Thus, design and deployment of APIs have become discrete tasks. In order to streamline each of these separate tasks or life stages of an API, Dell® Boomi® has developed the API lifecycle management system 230.

The API lifecycle management system 230 in an embodiment may allow an API product manager 210 to design, build, test, deploy, and perform maintenance on an API. An API product manager 210 in an embodiment may design, build, test, deploy, and perform maintenance on any API deployed in any service API policy enforcement platform with the API service control plane system 235. An API product manager 210 may use an API catalog within the API lifecycle management system 230 in an embodiment to design multiple APIs to perform user-defined actions (e.g., "GET") on user-defined datasets (e.g., having a dataset field name "shipping_address").

The API service control plane system 235 and API lifecycle management system 230 may also allow the API product manager 210 to authorize and register the user-developed APIs for use with a specific backend application. For example, the API product manager 210 in an embodiment may use the API lifecycle management system 230 to model code instructions for an API to be executed at the Gravitee® gateway 261, then register and authorize that API for use with the backend application 291. The API lifecycle management system 230 in an embodiment may also allow the API product manager 210 to design the method by which the API will authenticate calls received from the external agent 205. For example, the API lifecycle management system 230 in an example embodiment may allow the API product manager 210 to develop its own authentication broker for execution within the API lifecycle management system 230 itself, or may assign a remotely located and preexisting authentication broker (e.g., an Azure® broker).

The API product manager 210 may also set specific requirements for the way in which the API may be executed at the gateway (e.g., Gravitee® gateway 261) where it will be deployed in such an embodiment. With API service control plane system 235, the API lifecycle management system 230 may set specific requirements compatible with a plurality of API policy enforcement platforms such as a Gravitee® gateway, an Nginx®/Envoy® gateway, a Kubernetes®/Envoy® gateway, or another mesh gateway. For example, the specific requirements may be set to be compatible a mesh gateway such as 281 may include any combinations of Envoy®, Nginx HAProxy®, Netflix OSS Consul®, or Gravitee® proxies or gateways with any of Kubernetes®, Mesosphere®, Cloud Foundry®, OpenShift®, or the Boomi® Atom/Molecule as the underlying orchestration or container technology of the gateway. Such requirements may include gateway operation policies describing high-level functionality requirements for the API. These high-level gateway operation policies may include, for example, requirements set by the user via a service level agreement (SLA). For example, these SLA setting requirements set by the API product manager 210 at the API lifecycle management system 230 may specify a percentage of API calls successfully accessing data at the backend application the API services, via gateway 261 (e.g., dividing the total number of API calls received by the total number of calls processed), which may be referred to herein as call processing availability requirements. In other embodiments, call processing availability requirements may define the percentage of calls successfully processed by a single API via gateway 261, where gateway 261 executes multiple APIs. In still other embodiments, call processing availability requirements may define the percentage of authenticated calls that have not been rejected by a rate limiting service that are successfully processed by gateway 261.

Other gateway operation policies set by the API product manager 210 and received by the API lifecycle management system 230 in an example embodiment may include a maximum message size that will be processed by the API executing at gateway 261, a limit (e.g., rate limit) on the number of calls any one external agent (e.g., 205) may make to the API over a given time period, or a quota limit capping the number of calls the API may route to the backend application 291 over a period of time. In still other example embodiments, the gateway operation policies may include routing policies, or a requirement that the gateway executing the API support canary or red/black deployments, or work in tandem with a load balancing system or mesh network layer.

The API lifecycle management system 230 with API service control plane system 325 in an embodiment may generate the executable code instructions for the API designed by the API product manager 210 in any format compatible with plural API policy enforcement platforms that may be used with policy enforcement gateways such as 261, 262, 263, 271, and 281. In some embodiments, these executable code instructions for the API may be deployed directly from the API lifecycle management system 230 to one or more gateways chosen by the API product manager 210. In other embodiments, these executable code instructions may be transmitted from the API lifecycle management system 230 to the API product manager 210 who may then provision the API through direct communication within the API product manager 210 and one or more gateways (e.g., gateway 261).

Upon deployment of the API at one or more gateways in an embodiment, the API lifecycle management system 230 and API service control plane system 235 may monitor ongoing performance of the API. For example, a dashboard may display a usage history for the API over time, a number of calls made to each user-developed API (or microservice) over time, number of calls that timed out or were not processed over a period of time, and an average response time for received API calls. In such a way, the API lifecycle management system 230 and API service control plane system 235 in an embodiment may provide a single interface where the API product manager 210 may design, build, deploy, and maintain an API.

As described herein, APIs or microservices may be deployed across several different types of gateways, each having different capabilities. For example, the gateways 271 and 281 in an embodiment may operate in tandem with a mesh service layer. For example, a mesh gateway 281 may include mesh gateway such as 281 may include any combinations of Envoy®, Nginx®, HAProxy®, Netflix OSS®, Consul®, or Gravitee® or other proxies or gateways with any of Kubernetes®, Mesosphere®, Cloud Foundry®, OpenShift®, or the Boomi® Atom/Molecule or others as the underlying orchestration or container technology of the gateway. Such a mesh gateway 281 may operate with a service mesh technology such as via Istio®, Linkerd®, Maesh®, Meshery®, or other service mesh protocol types.

Gateways 261, 262, and 263 do not necessarily operate with a mesh service layer. As another example, the Nginx®/Envoy® native gateway 263 and the Kubernetes®/Envoy® service mesh embedded gateway 271 may have API policy enforcement platforms that provide internal load balancing capabilities, while the Gravitee® API policy enforcement platform gateways 261 and 262 may not. As yet another example, the Gravitee® gateways 261 and 262 may support canary deployments, but not red/black deployments. In still another example, the Nginx®/Envoy® gateway 263 may support blue/green deployment models, but not red/black deployment models. Because the functionality of each of these different types of gateways varies based on the type of API policy enforcement platform used, the ways in which each of these different types of gateways are configured also varies.

Configuration of any given gateway in an embodiment may achieved by writing and executing a configuration file at the selected gateway. A configuration file may require a particular syntax or format that can be understood by a given gateway type based on the type of API policy enforcement platform used. A gateway type, as referred to herein may be understood to encompass all gateways capable of processing a configuration file in a single type of format for each type of API policy enforcement platform used. For example, a configuration file written in a format that is understandable by the Gravitee® gateway 261 may also be understood by the Gravitee® gateway 263, such that gateways 261 and 263 are within the same gateway type. In another example, a configuration file written in a format that is understandable by the Gravitee® gateway 261 may not be understood by the Nginx®/Envoy® gateway 263, such that the Gravitee® gateway 261 falls within a different gateway type than the Nginx®/Envoy® gateway 263.

In existing systems, IT professionals (e.g., an API/System Administrator, DevOps Engineer, Enterprise Architect, API Developer, or an Integration Process Developer API) write the configuration files prior to deployment of the API or microservices at a given gateway. This requires IT professionals to be able to translate the high-level gateway operation policies (e.g., rate limit, routing policies, authentication, maximum message size) into a configuration file, and to understand the proper syntax and formatting for configuration files that are compatible with the chosen gateway. As described herein, there may be many different available gateway types to choose from, forcing IT professionals to become well versed in the functionality and infrastructure of each policy enforcement platform used with the gateway type, as well as the proper syntax and formatting for compatible configuration files.

Further, these high-level gateway operation policies may change over time. One example of such a change may include increasing the required availability of a given gateway to process API calls to accommodate a burst scenario (e.g., black Friday purchase orders). In existing systems, IT professionals may respond to such changes in high-level gateway operation policies by writing a new configuration file to accommodate the change, then temporarily shutting down the gateway executing the API in order to implement the new configuration. This may cause the API and all associated microservices operating at that gateway to be temporarily unavailable due to maintenance. Because the API lifecycle management system 230 already designs the API to meet the high-level gateway operation policies, and manages the full lifecycle of such an API, the API lifecycle management system 230 may decrease the burden on an API product manager 210 using such as system of writing and updating configuration files.

Figure 3:
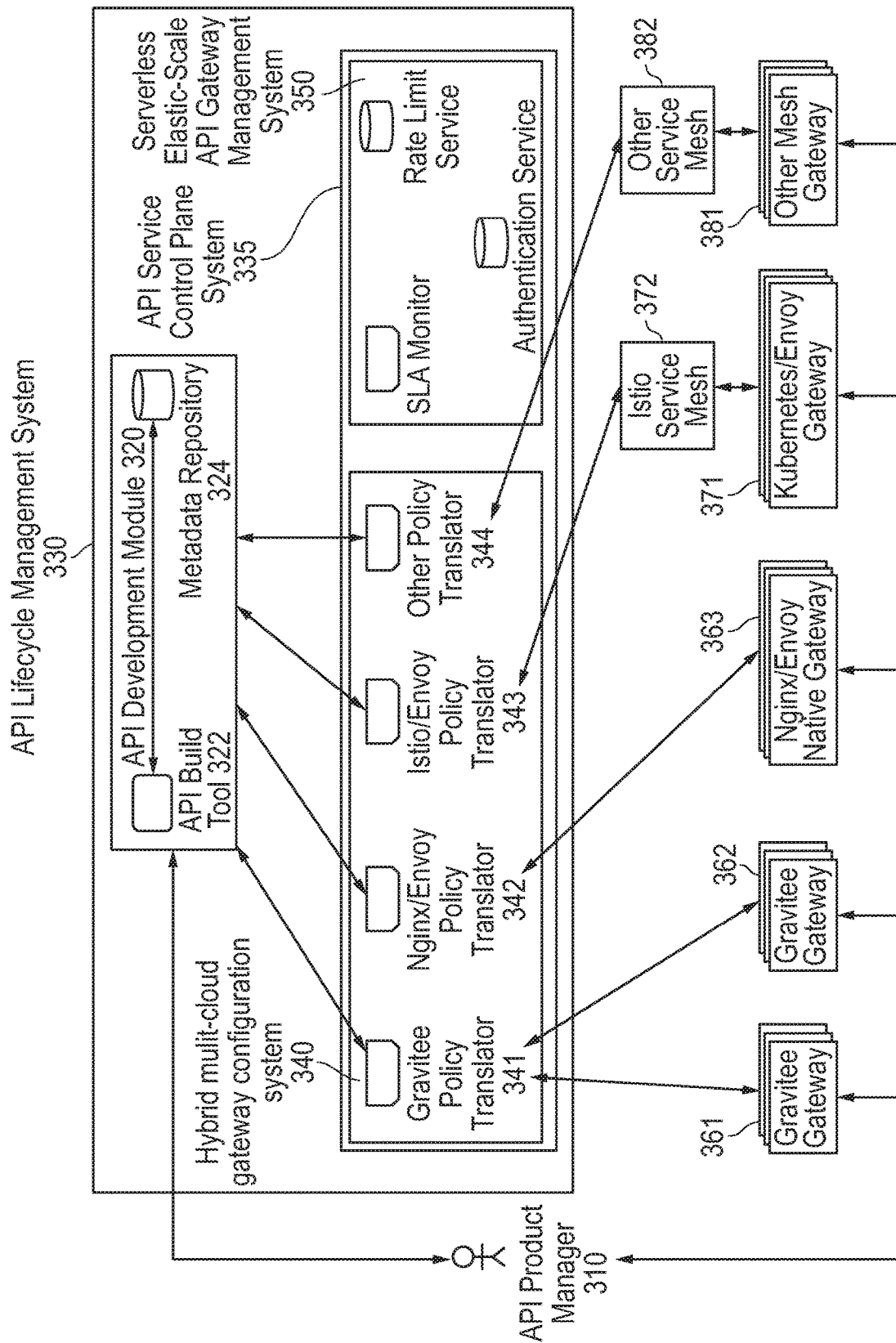
FIG. 3 is a graphical diagram illustrating an API service control plane system for implementing hybrid multi-cloud gateway configuration system according to an embodiment of the present disclosure.

FIG. 3 is a graphical diagram illustrating an API service control plane system 335 of the API lifecycle management system 330 for implementing hybrid multi-cloud gateway configuration system 340 according to an embodiment of the present disclosure. As described herein, a hybrid multi-cloud gateway configuration system 340 automates the translation of high-level gateway performance requirements into configuration files compatible with any number of gateway types implementing varied API policy enforcement platforms. The API lifecycle management system 330 provides an API development module 320 to build APIs to meet high-level gateway operation policies provided by an API product manager 310. Further, portions of the API service control plane 335 monitor calls processed by the API as additional functionality integrated within the API lifecycle management system.

The API lifecycle management system 330 in an embodiment may include the API development module 320 that operates to build the API based on the high-level gateway operation policies, and other instructions received from the API product manager 310. The API build tool 322 in an embodiment may include a graphical user interface (GUI) for an API product manager 310 to enter settings and instructions to build APIs into the API development module 320. The API build tool 322 may then generate code instructions for the API that achieve goals set by the API product manager 310, and transmit metadata associated with the API to the metadata repository 324. Such metadata may describe the actions performed by the API pursuant to various calls, operation policies, as well as the datasets upon which such actions were performed. The metadata may also include the high-level gateway operation policies set by the API product manager 310 via the API development module 320. Further, the metadata may also include performance metrics for API executions at one or more of the gateways (e.g., 361, 362, 363, 371, or 381) received by the API lifecycle management system 330 from the API product manager 310. In a particular aspect, mesh type gateways such as 371 an 381 may include performance metrics of APIs across mesh gateways such as any combinations of Envoy®, Nginx®, HAProxy®, Netflix OSS®, Consul®, or Gravitee® or other proxies or gateways with any of Kubernetes®, Mesosphere®, Cloud Foundry®, OpenShift®, or the Boomi® Atom/Molecule or others as the underlying orchestration or container technology of the gateway 381. Further, the mesh gateway 381 may operate with a service mesh technology such as via Istio® (as shown at 372 with Kubernetes®/Envoy® gateway at 3710 or via Linkerd®, Maesh®, Meshery®, or other service mesh protocol types. Thus, the API development module 320 may support development of the API, up to and potentially including deployment of the API to an external or remote location.

The API lifecycle management system 330 in an embodiment may include the hybrid, multi-cloud gateway configuration system 340 within API service control plane system 335 operating to optimize deployment and performance of the API. The API service control plane system 335 in an embodiment may be capable of monitoring, configuring, and reconfiguring multiple gateways (e.g., 361, 362, 363, 371, or 381) using various types of API policy enforcement platforms that may not be capable of communicating with or managing one another. As described herein, gateways may be said to be of differing types in an embodiment if a configuration file for one gateway API policy enforcement platform (e.g., 362) cannot be processed by another gateway (e.g., 363) API policy enforcement platform.

The hybrid, multi-cloud gateway configuration system 340 may operate to automatically translate high-level gateway performance policies to variously formatted configuration files for different API policy enforcement platforms. This process may be triggered in an embodiment by the API product manager 310 transmitting a selection of a particular gateway type with an API policy enforcement platform within the API development module 320 of the API lifecycle management system 330. The API product manager 310 may indicate the type of gateway where the API will be deployed, following development, via GUI interfaces with the API build tool 322. For example, the API product manager 310 may indicate the API will be deployed on a Gravitee® type gateway 261, or 362, an Nginx®/Envoy® type gateway 363, a Kubernetes®/Envoy® type gateway 371, or another type of gateway 381 that supports service mesh capabilities. For example mesh gateway such as 381 may include any combinations of Envoy®, Nginx®, HAProxy®, Netflix OSS®, Consul®, or Gravitee® or other proxies or gateways with any of Kubernetes®, Mesosphere®, Cloud Foundry®, OpenShift®, or the Boomi® Atom/Molecule or others as the underlying orchestration or container technology of the gateway. Such a mesh gateway 381 may operate with a service mesh technology 382 such as via Istio®, Linkerd®, Maesh®, Meshery®, or other service mesh protocol types. These are only a few examples of the types of gateways the API product manager 310 may select. It is contemplated the API lifecycle management system 330 may allow a user to select any currently known or future developed type of gateway that receives configuration files for deployment of APIs or microservices. In some embodiments, the API product manager 310 may select multiple types of gateways (e.g., a Gravitee® type gateway 361 or 362, and a Kubernetes®/Envoy® type gateway 371).

Some gateway types may operate in tandem with a service mesh controller 372 or 382. For example, the Kubernetes®/Envoy® service mesh embedded gateway 371 may operate in tandem with an Istio® service mesh controller 372 that coordinates communication between microservices to decrease internal traffic at the Kubernetes®/Envoy® gateway 371. The Kubernetes®/Envoy® 371 and other mesh gateways 381 operating in tandem with a service mesh controller 372 (Istio) or service mesh controller 382, respectively, in such a way may operate to enforce some of the high-level gateway operation policies incorporated within the gateway configuration file written by a policy translator, while the service mesh controller enforces other portions of the high-level gateway operation policies. For example, the service mesh controller may enforce portions of the high-level gateway operation policies dictating the ways in which certain microservices may communicate with one another. As another example, the Kubernetes®/Envoy® service mesh embedded gateway 371 or other mesh gateway 381 operating in tandem with a service mesh controller 372 or 382, respectively, may enforce routing policies within the high-level gateway operation policies. As explained, mesh gateway such as 381 may include any combinations of Envoy®, Nginx®, HAProxy®, Netflix OSS®, Consul®, or Gravitee® or other proxies or gateways with any of Kubernetes®, Mesosphere®, Cloud Foundry®, OpenShift®, or the Boomi® Atom/Molecule or others as the underlying orchestration or container technology of the gateway. Such a mesh gateway 381 may operate with a service mesh technology 382 such as via Istio®, Linkerd®, Maesh®, Meshery®, or other service mesh protocol types.

Once the API product manager 310 has selected a type of gateway (or multiple types of gateways), a policy translator associated with the API policy enforcement platform of the selected type(s) of gateway may retrieve the high-level gateway operation policies stored in metadata at the API development module 320. For example, in an embodiment in which the API product manager 310 has selected a Gravitee® type gateway, the Gravitee® policy translator 341 may retrieve the high-level gateway operation policies from the metadata repository 324. In another example embodiment in which the API product manager 310 has selected an Nginx®/Envoy® type gateway, the Nginx®/Envoy® policy translator 342 may retrieve the high-level gateway operation policies from the metadata repository 324. In still another example in which the API product manager 310 has selected a Kubernetes® type gateway operating in tandem with an Istio®/Envoy® service mesh layer, the Istio®/Envoy® policy translator 343 may retrieve the high-level gateway operation policies from the metadata repository 324. In still another example embodiment in which the API product manager 310 has selected another type of mesh gateway operating in tandem with another type of service mesh layer, the other policy translator 344 corresponding with the API policy enforcement platform associated with the other type mesh gateway may retrieve the high-level gateway operation policies from the metadata repository 324.

Each policy translator of the hybrid, multi-cloud gateway configuration system 340 that retrieves the high-level gateway operation policies in an embodiment may generate a configuration file for achieving the high-level gateway operation policies that is compatible with the API policy enforcement platform for the type of gateway associated with that policy translator. As described herein, configuration files may be written in different syntaxes, formats, or even languages of API policy enforcement platforms. For example, the Gravitee® gateways 361 and 362 may process configuration files written in Yet Another Markup Language (YAML). As another example, the Nginx®/Envoy® gateway 363 may process configuration files written in the Lua® programming language. As yet another example, the Kubernetes®/Envoy® service mesh embedded gateway 371 may process configuration files written in Java® or YAML. In still other examples, other gateway types (not shown), such as Kong® and HAProxy® may also process configuration files written in the Lua® programming language.

Each of the policy translators (e.g., 341, 342, 343, and 344) within the API service control plane system 335 in an embodiment may have access to stored or canned templates of configuration files written in the coding language understood by the type of gateway and API policy enforcement platforms associated with the policy translator. For example, the Gravitee® policy translator 341 may access a template gateway configuration file written in YAML. As another example, the Nginx®/Envoy® policy translator 342 may access a template gateway configuration file written in the Lua® programming language. For mesh gateways operating in tandem with a service mesh controller, the translator may access two separate templates—one for the service mesh configuration file and one for the gateway configuration file. For example, the Istio®/Envoy® policy translator 343 may access a template Istio® service mesh configuration file, executable by Istio® service mesh controllers, and may access a template gateway configuration file written in either Java® or YAML and executable by a Kubernetes®/Envoy® gateway. The other policy translator 344 in an embodiment may access a template service mesh configuration file written in any currently known or future developed coding language for a corresponding API policy enforcement platform or customized for use with any currently known or future developed service mesh controller (e.g., 382). Further, the other policy translator 344 in an embodiment may access a template gateway configuration file written in any known or future developed coding language for a corresponding API policy enforcement platform executable by a mesh gateway (e.g., 381) operating in tandem with a mesh service controller (e.g., 382).

Template configuration files in an embodiment may include placeholders where the template may be customized to adhere to user-specified gateway policies. For example, a template configuration file, written in YAML may read, in part:
systemlog:
destination: file
path: [INSERT]
net:
bindip: [INSERT]
port: [INSERT]

Policy translators within the API service control plane system 335 in an embodiment may customize the configuration file templates written in the programming language associated with that translator to enforce the high-level gateway operation policies retrieved from the metadata repository 324 in the API policy enforcement platform in an embodiment. Each of the policy translators (e.g., 341, 342, 343, or 344) in an embodiment may also have access to a specification describing the proper syntax and formatting for the programming language in which it will generate configuration files for the corresponding API policy enforcement platform. Policy translators (E.g., 341, 342, 343, or 344) in an embodiment may insert subsets of code instructions for enforcing the high-level gateway operation policies into the placeholders within the template configuration files. For example, the Gravitee® policy translator 341 in an embodiment may insert an IP address or a port address, defined within the routing policies of the high-level gateway operation policies, within the placeholders marked [INSERT], as shown above.

The Gravitee® policy translator 341 in such an embodiment may refer to the stored YAML specification to ensure the IP address or port address inserted in such a way comply with the syntax and formatting requirements of the YAML specification. Similarly, the Nginx®/Envoy® policy translator 342 in an embodiment may refer to the Lua® specification to implement routing policies of high-level gateway operation policies. Similarly, the Kubernetes®/Envoy® policy translator 342 in an embodiment may refer to the Java® or YAML specification to implement routing policies of high-level gateway operation policies. Similarly, the other policy translator 344 in an embodiment may refer to the specification for the coding language executable by the other mesh gateway 381 that may include a plurality of possible mesh gateways that combinations of Envoy®, Nginx HAProxy Netflix OSS®, Consul®, or Gravitee® or other proxies or gateways with any of Kubernetes®, Mesosphere®, Cloud Foundry®, OpenShift®, or the Boomi® Atom/Molecule or others as the underlying orchestration or container technology of the gateway and in coordination with service mesh technology 382 such as via Istio Linkerd Maesh Meshery®, or other service mesh protocol types and service mesh 382 to implement routing policies of high-level gateway operation policies. In such a way, each of the policy translators (e.g., 341, 342, 343, and 344) in an embodiment may be capable of customizing a template gateway configuration file or a template service mesh configuration file to enforce one or more of the high-level gateway operation policies stored retrieved by the metadata repository 324.

These generated configuration files (customized for the user-specified type of gateway or service mesh at which the API will be deployed) may then be transmitted to the user-selected type of gateway (and accompanying service mesh controller, where applicable). For example, the Gravitee® policy translator 341 may transmit a configuration file enforcing at least a portion of the high-level gateway operation policies in a format understood by Gravitee® type gateways to the Gravitee® gateway 361, or the Gravitee® gateway 362. As another example, the Nginx®/Envoy® policy translator 342 may transmit a configuration file enforcing at least a portion of the high-level gateway operation policies in a format understood by Nginx®/Envoy® type gateways to the Nginx®/Envoy® gateway 363.

As described above, mesh gateways operating in tandem with a service mesh controller may operate to enforce some of the high-level gateway operation policies incorporated within the gateway configuration file, while the service mesh controller enforces other portions of the high-level gateway operation policies incorporated within the service mesh configuration file. For example, the policy translator 343 may transmit a service mesh configuration file, written in a format executable by an Istio® controller, enforcing some portions of the high-level gateway operation policies to the Istio® service mesh controller 372. In such an embodiment, the Istio®/Envoy® policy translator 343 may also transmit a gateway configuration file enforcing other portions of the high-level gateway operation policies in a format understood by Kubernetes® type gateways to the Istio®/Envoy® service mesh 372, which may pass the gateway configuration file to the Kubernetes® gateway 371. In still another example, the other policy translator 344 may transmit both a service mesh configuration file and a gateway configuration file enforcing at least a portion of the high-level gateway operation policies in a format for the corresponding API policy enforcement platform understood by another mesh type gateway 381 including proxy or gateway protocol and protocol of the container or underlying orchestration technology for the mesh gateway to the other service mesh controller 382 and any technology protocols as described in example embodiments herein in a similar manner.

The automation of translating high-level gateway operation policies into executable configuration files written in a plurality of different programming languages for the corresponding API policy enforcement platform may obviate the need for the API product manager 310 to learn the proper syntax, formatting, and infrastructure for each of the gateways (e.g., 361, 362, 363, 371, and 381) or for any service mesh controller operating in tandem therewith (e.g., 372, or 382). Further, because the hybrid, multi-cloud gateway configuration system automatically translates the high-level gateway operation requirements to any number of configuration files via the API service control plane system 335 with ease, the API or various microservices may be deployed easily across different types of gateways, providing much greater flexibility in choice of gateway type for deployment. In addition, because the API service control plane system 335 in an embodiment is capable of communication with several gateways simultaneously, microservices for a single API may be distributed across two different gateways, each of a different type. This allows API developers to test in real-time which of the types of gateways handles traffic for a given microservice best.

Figure 4:
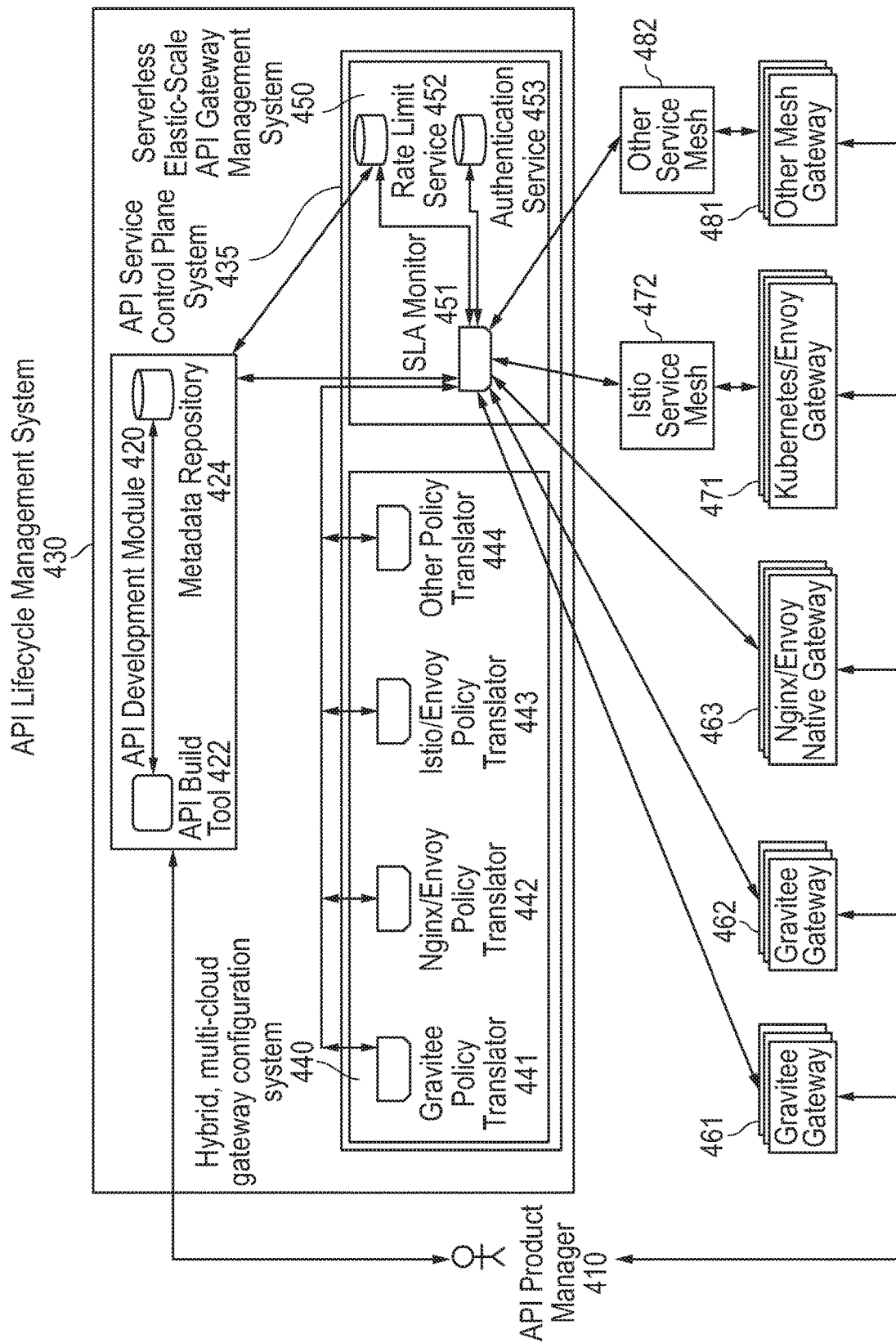
FIG. 4 is a graphical diagram illustrating a serverless elastic-scale API gateway management system according to an embodiment of the present disclosure.

FIG. 4 is a graphical diagram illustrating a serverless elastic-scale API gateway management system 450 within the API lifecycle management system 430 API service control plane system 435 according to an embodiment of the present disclosure. As described herein, the API service control plane system 435 allows microservices for a single API, or multiple instances of a single API to be distributed across two different gateways, of the same or different types of API policy enforcement platforms. For example, a first instance of an API may be deployed to the Gravitee® gateway 461, and a second instance of the same API may be deployed to the Gravitee® gateway 462. As another example, a first instance of an API may be deployed to the Gravitee® gateway 461, and a second instance of the same API may be deployed to the Nginx®/Envoy® gateway 463. In still another example, a first instance of a microservice for an API may be deployed to the Nginx®/Envoy® gateway 463, and a second instance of the same microservice may be deployed to the Kubernetes®/Envoy® service mesh embedded gateway 471. By monitoring ability of each of these gateways to process calls to these API or microservices instances, the API lifecycle management system 430 may allow API developers to test in real-time, through the API service control plane 435, which of these gateways most effectively meets the high-level gateway policies incorporated within the gateway configuration files executed at these gateways.

The serverless elastic-scale API gateway management system 450 in an embodiment may monitor the abilities of each of these different gateways to meet these high-level gateway policies, and may provision greater or fewer instances of the API or various microservices among these various gateways in order to ensure all high-level gateway operation requirements are consistently met. As described herein, upon deployment of the API at one or more gateways, through the API service control plane 435, in an embodiment, the API lifecycle management system 430 in an embodiment may monitor ongoing performance of the API. For example, a dashboard may display a usage history for the API over time, a number of calls made to each user-developed API (or microservice) over time, a number of calls that timed out or were not processed over a period of time, and an average response time for received API calls. This information may be gathered across all gateways at which an instance of an API or a microservice is executing in an embodiment.

Such metrics may be compared against the user-specified high-level gateway operation policies to determine compliance with these policies. For example, the serverless elastic-scale API gateway management system 450 in an embodiment may include a service level agreement (SLA) monitor 451 that may retrieve the high-level gateway operation policies and the performance metrics for an API executing at one or more of the gateways (e.g., 461. 462, 463, 471, or 481) from the metadata repository 424. A subset of the high-level gateway operation policies may comprise a service level agreement (SLA) that defines performance requirements for the API. For example, such an SLA setting may include required availability of the gateway at which the API is executing to process calls to the API and successfully access data at the backend application the API services at any given time. This may be referred to herein as a call processing availability requirement. The SLA setting may be a percentage value of API calls received at the gateway that successfully act to access resources at the backend application the API services. APIs associated with more critical business tasks (e.g., processing online sale orders) may be associated with a higher SLA setting or call processing availability requirement than other APIs performing less critical business tasks (e.g., locating a store nearest a customer's current location). Setting a lower call processing availability requirement via a lower SLA percentage setting for less critical APIs may save resources or costs for cloud computing occupancy in an embodiment.

Different APIs, performing different types of tasks, may have different call processing availability requirements or SLA settings. For example, an API operating to transmit a purchase request or order to a fulfillment center, a task critical to the profitability of an enterprise, may require the gateway at which the API is executing to process at least 99% of the calls to that API. This may be necessary in order to ensure the enterprise satisfies customers and avoids potential loss of sales from missed order requests. In contrast, a store-locator API, performing the far less critical task of identifying the store closest to a requesting user (e.g., external agent), may require the gateway at which the API is executing to process only 50% of the calls to that API. By setting this call processing availability requirement lower, the enterprise may effectively dedicate less computing power to this less critical task. In many cloud-computing environments, enterprises pay for the processing power they request to be made available, regardless of whether their computing resources (e.g., their APIs or microservices) actually use this processing power. Thus, by setting a lower call processing availability requirement, enterprises can decrease the amount of money they spend making processing power available to lower-priority tasks.

The SLA setting submitted by the API product manager 410 via the API development module 420 API build tool 422 and stored at the metadata repository 424 in an embodiment may further provide one or more spending caps in another embodiment. Spending cap SLA settings may dictate the amount of money the enterprise is willing to spend acquiring the cloud computing resources or processing power necessary to execute their APIs or microservices. For example, the SLA may set an overall cap (e.g., $1,000/hour, other budget limit, a maximum number of nodes or pods, maximum number of users per application, or similar) to acquire cloud computing resources at all gateways at which instances of an API are being executed. In other example embodiments, the SLA may set a per-gateway cap (e.g., $100/hour e.g., $1,000/hour, other budget limit, a maximum number of nodes or pods, maximum number of users per application, or similar) to acquire cloud computing resources at any one of the gateways at which instances of an API are being executed. In still other embodiments, the SLA may set a per-gateway type cap (e.g., $500/hour e.g., $1,000/hour, other budget limit, a maximum number of nodes or pods, maximum number of users per application, or similar) to acquire cloud computing resources at any of the gateways of a specific type (e.g., Gravitee® or Kubernetes®/Envoy®) at which instances of an API are being executed. In yet another embodiments, the SLA may set a per-microservice cap to acquire cloud computing resources across any or all gateways at which a particular microservices is executing. In some embodiments, a single SLA may combine one or more of these types of caps together, such that multiple caps may be simultaneously enforced.

The SLA monitor 451 in an embodiment may retrieve the high-level gateway operation policies, including these SLA setting requirements (e.g., call processing availability requirement or cost cap requirement) from the metadata repository 424. These SLA setting requirements may then be compared against the performance metrics for the gateways executing the API (e.g., the Nginx®/Envoy® gateway 463), which may also be retrieved by the SLA monitor 451 from the metadata repository 424. The SLA monitor 451 may determine whether the performance metrics indicate the SLA setting requirements for that API are being met. For example, the performance metrics may indicate the Nginx®/Envoy® gateway 463, executing an API associated with a call processing availability requirement of 95% has allowed 10% of API calls received over the last 24 hours to time out or not be processed. In such an example embodiment, the SLA monitor 451 may determine the Nginx®/Envoy® gateway 463 executing the API has made the processing power devoted to the API available only 90% of the time (resulting in timed out or locked calls 10% of the time) during a 24 hour period. This may not be in compliance with the requirement that the Nginx®/Envoy® gateway 463 make computing resources available to process those API calls 95% of the time. In a particular example, performance metrics may be tracked based upon response codes delivered to API calls or call attempts. For example, the SLA monitor 451 may assess what percentage of calls received an HTTP status 200 (indicating successful) versus those receiving an HTTP status of 400 (indicating a bad request) or an HTTP status of 503 (indicating unavailable/rejected calls). Other error codes may include time-out errors, locking, and others. In a particular embodiment, the rate of availability may be determined by 1−(count of error HTTP code)/(Count of Error HTTP codes+Count of NonError HTTP codes). Such response codes may be monitored to determine levels of call processing meeting or not meeting SLA availability requirements.

In contrast, the SLA monitor 451 may determine the Kubernetes®/Envoy® service mesh embedded gateway 471 executing a second instance of this same API may be in compliance with the requirement that the gateway 471 make computing resources available to process API calls 95% of the time. This may occur, for example, when the API is comprised of several microservices in communication with one another. The Kubernetes®/Envoy® service mesh embedded gateway 471 in such an example embodiment may more efficiently execute each of the microservices by allowing the Istio® service mesh controller 472 to organize communication between these microservices. The Nginx®/Envoy® gateway 463 in such an embodiment may not provide similar management of communication between microservices, resulting in unnecessary internal traffic at the Nginx®/Envoy® gateway 463 and decreased availability of computing resources to devote to processing or API calls.

Upon determination that one or more user-specified SLA setting requirements (either initial or recently updated) have not been met in an embodiment, the SLA monitor 451 may cause one or more policy translators to generate an updated gateway configuration file that is more likely to meet the SLA setting requirements. For example, the SLA monitor 451 in the example embodiment described directly above may determine the Nginx®/Envoy® gateway 463 is not meeting the SLA setting requirements, while the Kubernetes®/Envoy® service mesh embedded gateway 471 is. In such an example embodiment, the SLA monitor 451 may determine the Nginx®/Envoy® gateway 463 should be reconfigured to execute fewer instances of the API or microservices (or no longer execute any instances thereof), and may shift the instances removed from the Nginx®/Envoy® gateway to execute upon the Kubernetes®/Envoy® service mesh embedded gateway 471.

The SLA monitor 451 in such an example embodiment may adjust the user-specified gateway operation policies associated with the API to reflect these changes. The Nginx®/Envoy® policy translator 442 may update the Nginx®/Envoy® gateway configuration file to reflect these changes and transmit the updated Nginx®/Envoy® gateway configuration file to the SLA monitor 451, or directly to the Nginx®/Envoy® gateway 463 in such an embodiment. The Istio®/Envoy® policy translator 443 in such an embodiment may update the Kubernetes®/Envoy® service mesh embedded gateway configuration file to reflect these changes and transmit the updated Kubernetes®/Envoy® service mesh embedded gateway configuration file to the SLA monitor 451, or directly to Istio® service mesh controller 472 which may forward it to the Kubernetes®/Envoy® service mesh embedded gateway 463. In an embodiment in which the SLA monitor 451 receives the updated gateway configuration files, the SLA monitor 451 may transmit the updated gateway configuration files to the gateways with which they are compatible.

In another example embodiment, the gateway executing the API may have built-in load balancing capabilities that have made more computing power available to the API than is necessary, resulting in costs exceeding the SLA cost cap. For example, the Gravitee® gateway 461 in an embodiment may apply load-balancing methods to incoming API calls, resulting in execution of an API instance at more than one node. This may occur, for example, if a single node at the Gravitee® gateway 461 is configured to simultaneously execute two different APIs. If processing the total calls coming into a first node (running both APIs) requires more computing resources than this first node has available, the load balancing controller for the Gravitee® gateway 461 in such an embodiment may enlist a second node to process some of these calls. This may result in one or both of the APIs executing at the first node being provisioned at a second node. In some circumstances, provisioning of additional nodes in such a way may be associated with a premium cost. If the SLA setting requirements include a per-API cost cap, the provisioning of a second node for execution of one or both of the APIs in such an example embodiment may exceed the cost cap.

The SLA monitor 451 in such an example embodiment may adjust the SLA setting requirements to allow the nodes executing instances of the API whose cost cap has been exceeded to execute only that API, and no others. In such an example embodiment, the SLA monitor 451 may instruct the Gravitee® policy translator 441 to update the Gravitee® gateway configuration file to force nodes provisioned with one API instance to only execute code instructions for that provisioned API and no others. The Gravitee® policy translator 441 may then transmit the updated Gravitee® gateway configuration file to the Gravitee® gateway 461 (either directly or through the SLA monitor 451) via the API service control plane 435.

In still other embodiments, the SLA monitor 451 may receive updated SLA setting requirements that the user has altered since the initial configuration of the gateway executing the API. For example, an API product manager 410 in an embodiment may provide initial SLA setting requirements, in January, setting availability across all nodes within a gateway to execute an API. One or more of the gateways (e.g., 461, 462, 463, 471, or 481) may then be configured, through execution of a gateway configuration file generated by one or more policy translators (e.g., 441, 442, 443, or 444) via the API service control plane 435 to provide the computing resources necessary to meet this API call processing availability requirement. In November of that same year, the API product manager 410 in an embodiment may significantly increase this call processing availability requirement in anticipation of a burst scenario, where a large volume of API calls are expected to occur. This may occur, for example, when an API processes online orders on black Friday or cyber Monday following Thanksgiving in the United States.

In such an example embodiment, the initial gateway configuration file used to configure the Gravitee® gateway 461 may not effectively devote the processing power required in the updated SLA setting requirements to execution of the associated API. In such a scenario, the Gravitee® gateway 461 may need to be reconfigured to meet the updated SLA setting requirements. The SLA monitor 451 may instruct the Gravitee® policy translator 441 in the API service control plane 435 to update the Gravitee® gateway configuration file to devote enough processing power to meet the newly defined API call processing availability requirement. The Gravitee® policy translator 441 may then transmit the updated Gravitee® gateway configuration file to the Gravitee® gateway 461 (either directly or through the SLA monitor 451) via the API service control plane 435. In another embodiment, the SLA monitor 451 may instruct a policy translator such as the Istio®/Envoy® policy translator or the other policy translator 444 to update the configuration file related to the Kubernetes®/Envoy® mesh gateway 371 or other mesh gateway 381 that may include any combinations of Envoy®, Nginx HAProxy Netflix OSS®, Consul®, or Gravitee® or other proxies or gateways with any of Kubernetes®, Mesosphere®, Cloud Foundry®, OpenShift®, or the Boomi® Atom/Molecule or others as the underlying orchestration or container technology of the gateway, as well as to update portions of the configuration file for the Istio® service mesh or other service mesh technology 382 such as via Istio Linkerd Maesh Meshery ®, or other service mesh protocol types. These are only a few examples of ways in which the SLA monitor 451 may determine, through the API service control plane 435, that the execution of an API or one or more microservices at any given gateway (e.g., 461, 462, 463, 471, or 481) fails to meet one or more user-specified SLA setting requirements for a given API or microservice.

The ability of the API service control plane system 435 in an embodiment to communicate with multiple gateways of differing types in such a way allows the serverless elastic-scale API gateway management system 450 to more flexibly provision APIs across gateways. The serverless elastic-scale API gateway management system 450 in an embodiment may be said to be serverless because it is server or gateway agnostic. In other words, it may effectively manage the deployment of a given API or microservice across any number of gateways, or any number of types. The serverless elastic-scale API gateway management system 450 may be said to be elastic-scale in an embodiment because it is capable of re-provisioning APIs across multiple gateways in order to more efficiently manage received API calls. In contrast, the gateways at which these APIs or microservices are provisioned are capable of load-balancing calls within each gateway, but are not capable of managing the deployment of a given API across multiple gateways, especially not gateways of varying types. This may be the case because gateways of differing API policy enforcement platform types cannot communicate with one another in existing systems. Thus, abstracting this capability of deploying APIs to the API service control plane system 435 that is capable of communicating with each of these varying gateway types results in more efficient execution of APIs, in tighter compliance with user-specified high-level gateway operation policies.

As described herein, the API service control plane system 435 in an embodiment may be in communication with several different gateways (e.g., 461, 462, 463, 471, or 481) at which APIs or microservices may be provisioned, and the same user-specified rate limit may apply to each of these APIs or microservices executing at each of these gateways. In existing systems that do not employ an API service control plane system 435, each individual gateway at which the API is provisioned may enforce a rate limit within the high-level gateway operation policies incorporated into the gateway configuration file. This may result in each gateway performing the same functionality for every call, increasing processing costs at each gateway.

Further, such a model may allow external agents making API calls to circumvent rate limits. For example, Gravitee® gateway 461 may determine a rate limit associated with an individual external agent has been exceeded, and it may reject further calls from that external agent. The external agent may then route API calls to the Nginx®/Envoy® gateway 463 instead of the Gravitee® gateway 461. In such an example scenario, because these gateways are not in communication with one another, the Nginx®/Envoy® gateway 463 may determine the rate limit associated with that external agent has not yet been met, and allow that call to be processed.

The serverless elastic-scale API gateway management system 450 in an embodiment may include a rate limit service 452 that enforces such rate limits across all gateways (e.g., 461, 462, 463, 471, or 481). Abstracting this task to the API service control plane system 435 may require fewer cloud computing resources at the gateway, freeing up processing power to devote to execution of the API. Further, because the rate limit service 452 in an embodiment may communicate with each of the gateways (either directly or via the SLA monitor 451), it may enforce agent-specific rate limiting policies across all gateways. In other words, it may disallow the external agent's circumvention of rate limiting policies at a single gateway, as described directly above.

In an embodiment, upon receiving an API call request from an external agent, a gateway may transmit a request for routing policies to the SLA monitor 451 or the rate limit service 452. This request may include an identification of the external agent placing the request in an embodiment. In other embodiments, this request may also include authentication credentials for the external agent. The SLA monitor 451 in such an embodiment may transmit the request to the rate limit service 452, which monitors all incoming requests associated with that external agent. If the number of calls associated with that external agent over a preset period of time (e.g., one minute, one hour, 24 hours) exceeds the preset rate limit associated with an individual external agent within the high-level gateway operation policies associated with that API, the rate limit service 452 may transmit an instruction to the SLA monitor 451 or directly to the gateway from which the request was transmitted, to reject the API call requested by the external agent.

In another embodiment, the serverless elastic-scale API gateway management system 450 may include an authentication service 453, which may operate to check the external agent's authentication credentials. If such an authentication service 453 cannot authenticate the credentials included within the request from the gateway to transmit routing policies, the serverless elastic-scale API gateway management system 450 may transmit an instruction to the gateway to reject the API call request received at the gateway by the external agent.

In another aspect of an embodiment, the serverless elastic-scale API gateway management system 450 may transmit the routing policies requested by the gateway. For example, in an embodiment in which the rate limiting service 452 determines the rate limit for the external agent has not been exceeded, the rate limit service 452 may transmit an instruction to the SLA monitor 451 to transmit routing policies for the API or microservice to the gateway, as requested. The gateway may then route the API call requested by the external agent to an address or location at the backend application the API serves, as specified in the routing policies received from the serverless elastic-scale API gateway management system 450. In another embodiment, the serverless elastic-scale API gateway management system 450 may only transmit such routing policies if the external agent's credentials have also been authenticated. Thus, the API service control plane system 435 in an embodiment may provide multiple systems for streamlines configuration, deployment, monitoring, and reconfiguration of multiple types of non-compatible gateways to accommodate high-level gateway operation policies set by a user, without requiring that user to understand the underlying configuration or infrastructure of a given gateway.

Figure 5:
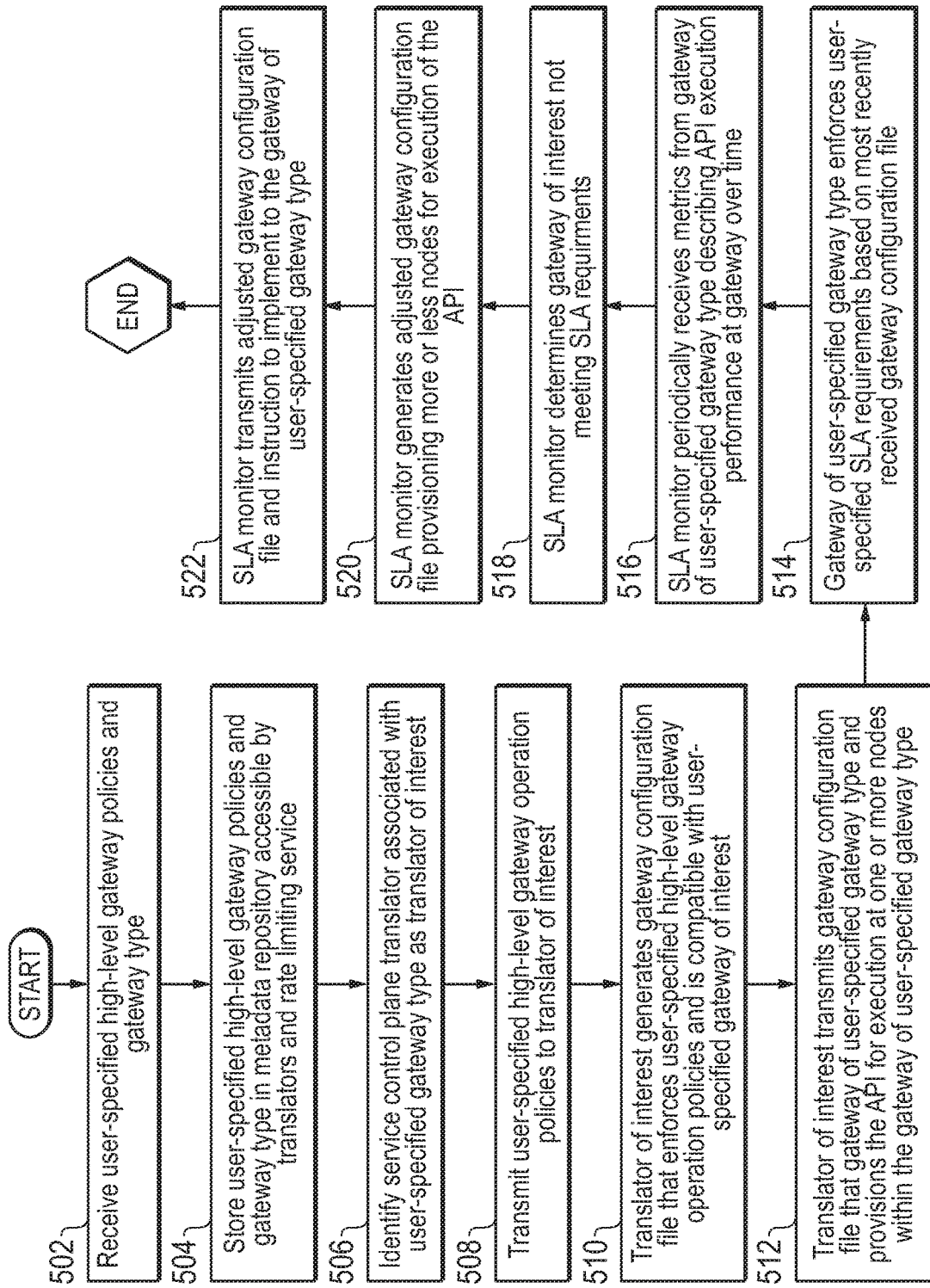
FIG. 5 is a flow diagram illustrating a method of deploying and monitoring performance of an API at one or more gateways according to an embodiment of the present disclosure.

FIG. 5 is a flow diagram illustrating a method of deploying and monitoring performance of an API at one or more gateways of varying gateway API policy enforcement platform types according to an embodiment of the present disclosure. As described herein, the API lifecycle management system in an embodiment may provide a single interface and API service control plane where the API product manager may design, build, deploy, and maintain an API for any of several API policy enforcement platforms for gateways.

At block 502, user-specified high-level gateway operation policies and a user-selected gateway type may be received by the API lifecycle management system in an embodiment. In an example embodiment described with reference to FIG. 2, for example, the API product manager 210 may set gateway operation policies describing high-level functionality requirements for the API. The high-level gateway operation policies may be set by an API product manager 210 via a GUI or other interface at an API management tool of an API development module. For example, the gateway operation policies set by the API product manager 210 at the API lifecycle management system 230 may specify a percentage of API calls received at the gateway that are successfully processed to access the data stored at the backend application serviced by the API. This may be one form of SLA settings in an embodiment. Other gateway operation policies set by the API product manager 210 and received by the API lifecycle management system 230 in an example embodiment may include a maximum message size that will be processed by the API executing at gateway 261, a limit (e.g., rate limit) on the number of calls any one external agent (e.g., 205) may make to the API over a given time period, or a quota limit capping the number of calls the API may route to the backend application 291 over a period of time. In still other example embodiments, the gateway operation policies may include routing policies, or a requirement that the gateway executing the API support canary or red/black deployments, or work in tandem with a load balancing system or mesh network layer.

In another example embodiment described with reference to FIG. 3, the API product manager 310 may transmit a selection of a particular gateway type to the API lifecycle management system 330. This may indicate the type of API policy enforcement platform operating where the API will be deployed, following development. For example, the API product manager 310 may indicate the API will be deployed on a Gravitee® type gateway, an Nginx®/Envoy® type gateway, a Kubernetes®/Envoy® type mesh gateway, or another type of gateway that supports service mesh capabilities. In some embodiments, the API product manager 310 may select multiple types of gateways (e.g., a Gravitee® type gateway, and a Kubernetes®/Envoy® type service mesh embedded gateway). In yet other example embodiments, an other API deployment may be selected for other mesh gateways such as 381. In such embodiments, mesh gateway such as 381 may include any combinations of Envoy®, Nginx HAProxy Netflix OSS®, Consul®, or Gravitee® or other proxies or gateways with any of Kubernetes®, Mesosphere®, Cloud Foundry®, OpenShift®, or the Boomi® Atom/Molecule or others as the underlying orchestration or container technology of the gateway. Such a mesh gateway 381 may operate with a service mesh technology 382 such as via Istio Linkerd Maesh Meshery®, or other service mesh protocol types as described in embodiments herein.

The API lifecycle management system in an embodiment may store the user-specified high-level gateway policies and gateway type in metadata repository accessible by translators and rate limiting service at block 504 in the API service control plane. For example, in an embodiment described with reference to FIG. 3, the API lifecycle management system 330 may include an API development module 320 that operates to build the API based on the high-level gateway operation policies, and other instructions received from the API product manager 310 in the API management tool 322. The API build tool 322 in an embodiment may generate code instructions for the API that achieve goals set by the API product manager 310, and transmit metadata associated with the API to the metadata repository 324. Such metadata may describe the actions performed by the API pursuant to various calls, as well as the datasets upon which such actions were performed. The metadata may also include the high-level gateway operation policies set by the API product manager 310 via the API lifecycle management system 330.

At block 506, the API lifecycle management system may identify the API service control plane system translator associated with the user-specified type of gateway as the translator of interest to operate in the selected API policy enforcement platform in an embodiment. For example, in an embodiment described with reference to FIG. 3, in which the user selects a Gravitee® type gateway 361 or 362, the API lifecycle management system 330 may identify the Gravitee® policy translator 341 as the translator of interest. In another embodiment in which the user selects a Nginx®/Envoy® type gateway 363, the API lifecycle management system 330 may identify the Nginx®/Envoy® policy translator 342 as the policy translator of interest. In yet another embodiment in which the user selects a Kubernetes®/Envoy® type gateway 371, operating in tandem with an Istio® mesh service controller 372, the API lifecycle management system 330 may identify the Istio®/Envoy® policy translator 343 as the policy translator of interest. In still another embodiment in which the user selects another mesh gateway type 381 including a proxy or gateway services as well as a container or underlying orchestration technology for the gateway, operating in tandem with another mesh service controller 382, the API lifecycle management system 330 may identify the other policy translator 344 as the policy translator of interest.

The API lifecycle management system in an embodiment may transmit the user-specified high-level gateway operation policies to the translator of interest at block 508. For example, the API lifecycle management system 330 in an embodiment may transmit to the Gravitee® policy translator 341 the user-specified high-level gateway operation policies. An example of such high-level gateway operation policies may include a required SLA setting availability of a node executing the API or microservice thereof to process calls to the API or microservice at any given time. Other examples may include information necessary to deploy the API or microservice in a canary, red/black, or blue/green configuration. Still other examples may include high-level gateway operation policies specifying the ways in which multiple microservices operating at a single gateway will communicate with one another. For example, a high-level gateway operation policy may include a requirement that microservices executing in a test environment not be capable of communicating with microservices executing in a production environment.

At block 510, the translator of interest may generate a gateway configuration file in syntax and commands that may operate in the selected type of API policy enforcement platform. The gateway configuration file that enforces the user-specified high-level gateway operation policies and is compatible with the user-specified gateway of interest. For example, the Gravitee® policy translator 341 in an embodiment may generate a gateway configuration file that enforces a high-level gateway operation policy setting a required availability of a node executing the API to process calls to the API at any given time. Such a gateway configuration file in an embodiment may be written in YAML, and may be executable at the Gravitee® gateway 361 or 362. As another example, the Nginx®/Envoy® policy translator 341 may generate a gateway configuration file that enforces the required availability for processing API calls, written in the Lua® code language and executable at the Nginx®/Envoy® gateway 363. As yet another example, the Istio®/Envoy® policy translator 342 may generate a gateway configuration file that enforces the required availability for processing API calls and may generate a service mesh configuration file that enforces the requirement that microservices executing in a test environment not be capable of communicating with microservices executing in a production environment. Such a gateway configuration file may be written in Java® or YAML, and may be executable by the Kubernetes®/Envoy® service mesh embedded gateway 371. Such a service mesh configuration file may be customized from an Istio® template configuration file, and may be executable at the Istio® service mesh controller 372. In still another example, the other policy translator 344 may generate a gateway configuration file that enforces the required availability for processing API calls and may generate a service mesh configuration file that enforces the requirement that microservices executing in a test environment not be capable of communicating with microservices executing in a production environment. Such a gateway configuration file may be written in any coding language executable by the API policy enforcement platform operating at the other mesh gateway 381. Such a service mesh configuration file may be written in any coding language executable at the other service mesh controller 382.

Each of the policy translators (e.g., 341, 342, 343, and 344) within the API service control plane system 335 in an embodiment may have access to stored or canned templates of configuration files written in the coding language of the API policy enforcement platform understood by the type of gateway associated with the policy translator. For mesh gateways operating in tandem with a service mesh controller, the translator may access two separate templates—one for the service mesh configuration file and one for the gateway configuration file. Template configuration files in an embodiment may include placeholders where the template may be customized to adhere to user-specified gateway policies received via GUI or otherwise at the API management tool 322.

Policy translators within the API service control plane system 335 in an embodiment may customize the configuration file templates written in the programming language of the API policy enforcement platform associated with that translator to enforce the high-level gateway operation policies retrieved from the metadata repository 324 in an embodiment. Each of the policy translators (e.g., 341, 342, 343, or 344) in an embodiment may also have access to a specification describing the proper syntax and formatting for the programming language of the API policy enforcement platform in which it will generate configuration files. Policy translators (E.g., 341, 342, 343, or 344) in an embodiment may insert subsets of code instructions for enforcing the high-level gateway operation policies into the placeholders within the template configuration files in the API policy enforcement platform.

The translator of interest may transmit the gateway configuration file to a gateway of the user-specified gateway type in an embodiment at block 512. For example, in an embodiment described with reference to FIG. 3, the Gravitee® policy translator 341 may transmit the gateway configuration file, written in YAML and executable by a Gravitee® type gateway, to the Gravitee® gateway 361. In some embodiments in which the user has specified multiple gateway types, multiple translators may transmit gateway configuration files to different types of gateways. For example, in an embodiment in which a user has selected the Gravitee® type gateway and the Nginx®/Envoy® type gateway, the Gravitee® policy translator 341 may transmit a first gateway configuration file, written in YAML and executable by a Gravitee® type gateway, to the Gravitee® gateway 361. In that same example embodiment, the Nginx®/Envoy® policy translator 342 may transmit a second gateway configuration file, written in Lua® and executable by an Nginx®/Envoy® type gateway, to the Nginx®/Envoy® gateway 362. In such an example embodiment, both the first gateway configuration file, written in YAML, and the second gateway configuration file, written in Lua® may operate to enforce identical high-level gateway operation policies.

In some embodiments in which the user-specified gateway type works in tandem with a service mesh controller, the gateway configuration file may be transmitted to the service mesh controller, which may forward the gateway configuration file to a gateway of the user-specified gateway type. For example, in another embodiment described with reference to FIG. 3, the Istio®/Envoy® policy translator 343 may transmit the gateway configuration file, written in Java® or YAML and executable by Kubernetes®/Envoy® type gateways, to the Istio® service mesh 381 working in tandem with the Kubernetes®/Envoy® service mesh embedded gateway 371. The Istio® service mesh controller 381 in such an example embodiment may forward the gateway configuration file on to the Kubernetes®/Envoy® service mesh embedded gateway 371. In such an embodiment, the policy translator of interest at block 512 may also transmit a service mesh configuration file to the service mesh controller. For example, the Istio®/Envoy® policy translator 343 may also transmit an Istio® service mesh configuration file to the Istio® service mesh controller 371.

The API lifecycle management system in some embodiments may provision the API at the user-specified gateway type at block 512 via the API service control plane. As described herein, the API lifecycle management system may provide a single interface for a user to design, build, test, deploy, and manage an API. Following the build and test phases of the API lifecycle, the API lifecycle management system may generate code instructions that execute the API, and transmit those code instructions to either the API product manager, or to a remote gateway where the API product manager wishes the code to be executed. Thus, in some embodiments, the API lifecycle management system 330 may deploy or provision the API directly to one of the gateways (e.g., 361, 362, 363, 371, or 381) of the user-specified gateway type.

At block 514, a gateway of the user-specified gateway type may enforce one or more of the user-specified high-level gateway operation policies, based on a most recently received gateway configuration file. As described in an embodiment with reference to FIG. 3, one of the policy translators (e.g., 341, 342, 343, or 344) may transmit an initial gateway configuration file to a gateway of the user-specified gateway type (e.g., 361, 362, 363, 371, or 381), prior to deployment of the API at these gateways. As also described in an embodiment with reference to FIG. 4, the SLA monitor 451 may enlist one or more of these policy translators (e.g., 441, 442, 443, or 444) to update this initial gateway configuration file to more effectively meet the user-specified high-level gateway operation policies concurrent with operations, and transmit the updated gateway configuration file to the gateway(s) (e.g., 461, 462, 463, 471, or 481), that are currently provisioned to execute the API.

Both the initial gateway configuration file and the updated gateway configuration file in an embodiment may incorporate one or more of the high-level gateway operation policies for enforcement of such policies at the gateway. For example, the high-level gateway operation policies may include a key validation policy or a header validation policy, enforceable at the gateway executing the API, rather than at the API service control plane system 335. In another example embodiment, the high-level gateway operation policies may include one or more of the SLA setting requirements described in greater detail with respect to FIG. 4. For example, the gateway configuration file (either initial or updated) may indicate the API should be deployed according to a canary deployment model, or may indicate 95% of API calls made to the gateway must be successfully processed to access data at the backend application serviced by the API.

The SLA monitor in an embodiment may periodically receive metrics from the gateway executing the API at block 516, describing API execution performance at the gateway over time. For example, the API lifecycle management system in an embodiment may gather such metrics for display within its dashboard. These metrics may further be stored within the metadata repository of the API lifecycle management system. The SLA monitor in an embodiment may retrieve this performance metric metadata from the metadata repository in an embodiment.

At block 518, the SLA monitor may determine the gateway of interest has not met the SLA setting requirements given by the user within the user-specified high-level gateway operation policies. For example, in an embodiment described with reference to FIG. 4, the performance metrics may indicate the Nginx®/Envoy® gateway 463, executing an API associated with a call processing availability requirement of 95% has allowed 10% of API calls received over the last 24 hours to time out or not be processed. In contrast, the SLA monitor 451 may determine the Kubernetes®/Envoy® service mesh embedded gateway 471 executing a second instance of this same API may be in compliance with the requirement that the gateway 471 make computing resources available to process API calls 95% of the time. As discussed further, the API service control plane may be used to shift processing power dedicated to processing API calls over the Kubernetes®/Envoy® service mesh embedded gateway 471.

In another example embodiment, the gateway executing the API may have built-in load balancing capabilities that have made more computing power available to the API than is necessary, resulting in costs exceeding the SLA cost cap. For example, the Gravitee® gateway 461 in an embodiment may apply load-balancing methods to incoming API calls, resulting in execution of an API instance at more than one node, and thus incurring a premium cost. If the SLA setting requirements include a per-API cost cap, the provisioning of a second node for execution of one or both of the APIs in such an example embodiment may exceed the cost cap.

In still other embodiments, the SLA monitor 451 may receive updated SLA setting requirements that the user has altered since the initial configuration of the gateway executing the API. For example, an API product manager 410 in an embodiment may provide initial SLA setting requirements, in January, setting availability across all nodes within a gateway to execute an API. One or more of the gateways (e.g., 461, 462, 463, 471, or 481) may then be configured, through execution of a gateway configuration file generated by one or more policy translators (e.g., 441, 442, 443, or 444) to provide the computing resources necessary to meet this API call processing availability requirement. In November of that same year, the API product manager 410 in an embodiment may significantly increase this call processing availability requirement in anticipation of a burst scenario, where a large volume of API calls are expected to occur. This may occur, for example, when an API processes online orders on black Friday or cyber Monday following Thanksgiving in the United States. In such an example embodiment, the initial gateway configuration file used to configure the Gravitee® gateway 461 may not effectively devote the processing power required in the updated SLA setting requirements to execution of the associated API. The API build tool 422 may be used to receive updated November high-level gateway operation policies including the updated SLA settings.

At block 520, the SLA monitor may instruct one or more policy translators to generate adjusted or updated gateway configuration files that are more likely to meet the SLA setting requirements. For example, the SLA monitor 451 in the example embodiment may determine the Nginx®/Envoy® gateway 463 is not meeting the SLA setting requirements, while the Kubernetes®/Envoy® service mesh embedded gateway 471 is. In such an example embodiment, the SLA monitor 451 may determine the Nginx®/Envoy® gateway 463 should be reconfigured to execute fewer instances of the API or microservices (or no longer execute any instances thereof), and may shift the instances removed from the Nginx®/Envoy® gateway to execute upon the Kubernetes®/Envoy® service mesh embedded gateway 471. The SLA monitor 451 in such an example embodiment may adjust the user-specified gateway operation policies associated with the API to reflect these changes.

In another example embodiment, the SLA monitor 451 may determine the gateway has provisioned the API across nodes in such a way as to incur unnecessary costs. This may occur by allowing a node to provision more than one API at a time. The SLA monitor 451 in such an example embodiment may adjust the SLA setting requirements to allow the nodes executing instances of the API whose cost cap has been exceeded to execute only that API, and no others. This may avoid the unnecessary provisioning the API at a second node and avoid cost of cloud space node operation.

In yet another example embodiment, the initial gateway configuration file used to configure the Gravitee® gateway 461 may not effectively devote the processing power required in updated SLA setting requirements recently received from the API developer to execution of the associated API. In such a scenario, the Gravitee® gateway 461 may need to be reconfigured to meet the updated SLA setting requirements. The SLA monitor 451 may instruct the Gravitee® policy translator 441 to update the Gravitee® gateway configuration file to devote enough processing power to meet the newly defined API call processing availability requirement. The Gravitee® policy translator 441 may then transmit the updated Gravitee® gateway configuration file to the Gravitee® gateway 461 (either directly or through the SLA monitor 451). These are only a few examples of ways in which the SLA monitor 451 may determine the execution of an API or one or more microservices at any given gateway (e.g., 461, 462, 463, 471, or 481) fails to meet one or more user-specified SLA setting requirements for a given API or microservice.

The SLA monitor may transmit the adjusted gateway configuration file and an instruction to implement the adjusted gateway configuration file to the gateway of the user-specified gateway type at block 522 via the API service control plane system. For example, an adjusted gateway configuration file generated by the Gravitee® policy translator 441 may transmitted to either or both of the Gravitee® gateways 461 and 462 via the API service control plane system. As another example, an adjusted gateway configuration file generated by the Nginx®/Envoy® policy translator 442 may be transmitted to the Nginx®/Envoy® gateway 463. As yet another example, an adjusted gateway configuration file generated by the Istio®/Envoy® policy translator may be transmitted to the Istio® service mesh controller 472, and forwarded onto the Kubernetes®/Envoy® service mesh embedded gateway 471 having an Envoy® proxy or gateway with a Kubernetes® container or underlying orchestration system. The API service control plane system provides for translated, adjusted, gateway configuration files compatible with any of a plurality of API policy enforcement platforms to be transmitted to any of a plurality of gateway types. As yet another example, an adjusted gateway configuration file generated by the other policy translator 444 may be transmitted a service mesh controller 482 such as via Istio Linkerd Maesh Meshery®, or other service mesh protocol types, and forwarded to the mesh gateway such as 481 may include any combinations of Envoy®, Nginx HAProxy Netflix OSS®, Consul®, or Gravitee® or other proxies or gateways with any of Kubernetes®, Mesosphere®, Cloud Foundry®, OpenShift®, or the Boomi® Atom/Molecule or others as the underlying orchestration or container technology of the gateway.

In some embodiments, the instructions to implement the gateway configuration file may involve a shut-down and restart of the gateway. In other embodiments, such a reboot may not be necessary. For example, an instruction transmitted to the Kubernetes®/Envoy® service mesh embedded gateway via the Istio® service mesh controller may instruct rebooting of only certain microservices operating at the gateway. The method may then end.

Figure 6:
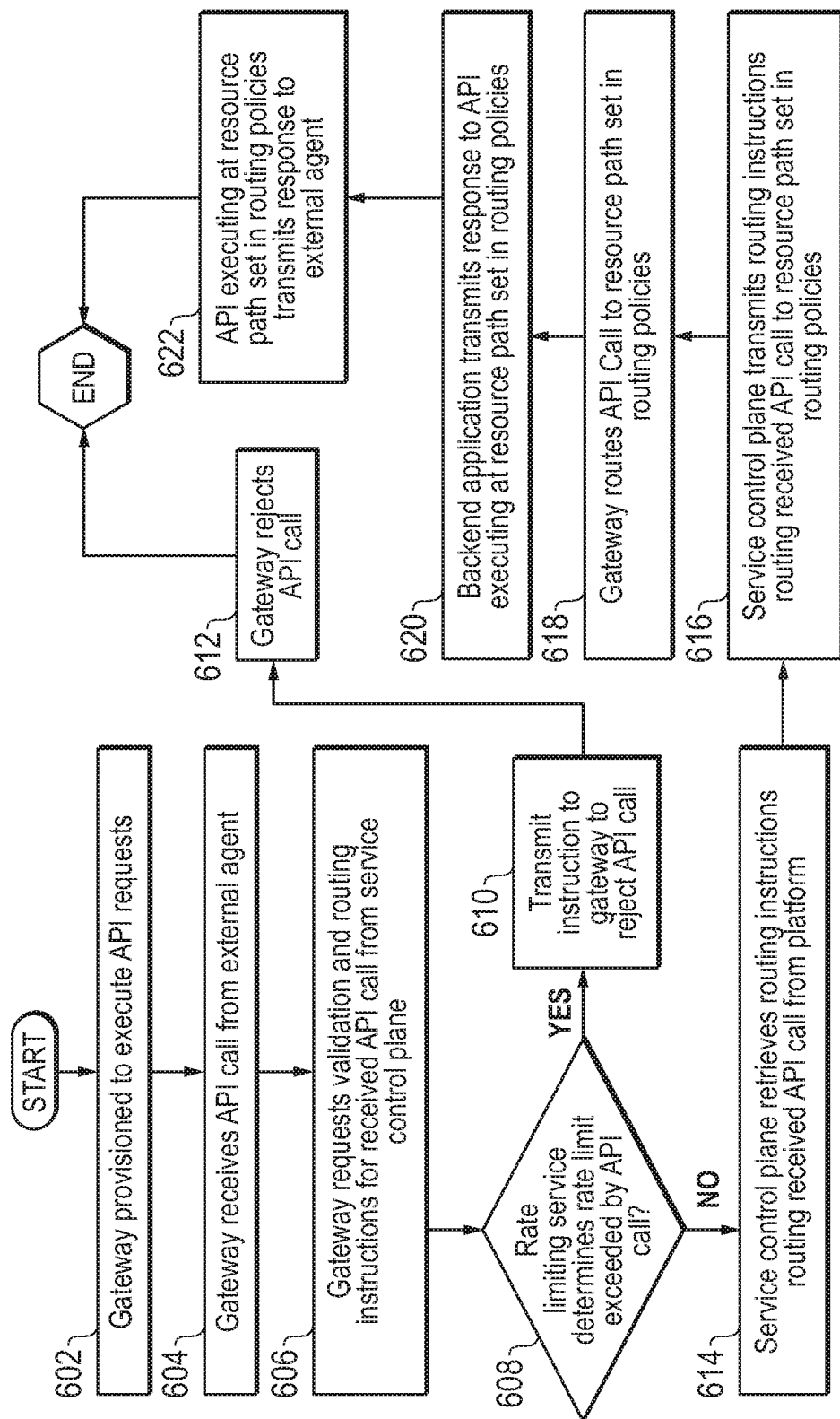
FIG. 6 is a flow diagram illustrating a method of enforcing high-level gateway operation policies at an API service control plane system according to an embodiment of the present disclosure.

FIG. 6 is a flow diagram illustrating a method of enforcing high-level gateway operation policies such as rate limiting or authentication at an API service control plane system rather than at the gateway according to an embodiment of the present disclosure. As described herein, the API service control plane system allows microservices for a single API, or multiple instances of a single API to be distributed across plural different gateways, of the same or different types. By removing tasks for enforcing certain high-level gateway operation policies to the API service control plane system, more computing resources may be released at the gateways and devoted specifically to routing of API calls.

At block 602, the gateway is provisioned with the executable API code instructions or with one or more microservices of the API. As described herein, the API lifecycle management system may provide a single interface for a user to design, build, test, deploy, and manage an API via the API service control plane system. Following the build and test phases of the API lifecycle, the API lifecycle management system may generate code instructions that execute the API, and transmit those code instructions to either the API product manager, or to a remote computing node at a gateway where the API product manager wishes the code to be executed. Thus, in some embodiments, such as an embodiment described with reference to FIG. 3, the API lifecycle management system 330 may deploy or provision the API directly to one of the gateways (e.g., 361, 362, 363, 371, or 381) of the user-specified gateway type. In another example embodiment, the API product manager 310 may deploy or provision the API directly to one of the gateways (e.g., 361, 362, 363, 371, or 381) of the user-specified gateway type.

The gateway may receive an API call from an external agent in an embodiment at block 604. For example, in an embodiment described with reference to FIG. 2, an API may be deployed at one or more gateways, such as a Gravitee® gateway 261. In such an embodiment, the API or portions thereof operating at any one of the gateways 261, 262, 263, 271, or 281 may operate to facilitate communications between a backend application managing data that an external agent wishes to access and the external agent requesting such access. For example, an external agent 205 may wish to access information or data stored at or managed by backend application 291 such as a purchase order system or a store locator system. An API provisioned at the Gravitee® gateway 261 in such an example embodiment may receive an API call requesting such data from the external agent 205.

At block 606, the gateway may request validation and routing instructions for the received API call from the API service control plane system. For example, in an embodiment described with reference to FIG. 4, upon receiving an API call request from an external agent, a gateway may transmit a request for routing policies to the SLA monitor 451 or the rate limit service 452. This request may include an identification of the external agent placing the request, identification of the gateway transmitting the request, and may also include authentication credentials for the external agent.

The SLA monitor in an embodiment may determine at block 608 whether the rate limit associated with the external agent and the API the external agent is attempting to call has been met or exceeded. As described herein, embodiments of the present disclosure may abstract the rate limiting service away from individual gateways, and into the API service control plane system, which is in communication with several different types of gateways that cannot communicate with one another. As such, the rate limiting service within the API service control plane system may apply a rate limit specific to a single external agent across all gateways. In other words, the rate limiting service may control the number of calls a single external agent makes, regardless of which gateways at which the request from the external agent are received. For example, an attack on a purchase order system (or store locator) by flooding it with automatic calls may be avoided with rate limiting.

In another embodiment, the rate limit may also apply to individual gateways, rather than or in addition to individual external agents. For example, the rate limiting service may determine at block 608 whether the number of API calls processed by the gateway from which the request for routing instructions was received exceeds the maximum number of calls such a gateway may make on its backend application over a preset period of time. In still another embodiment, the rate limit may apply to all gateways accessing a single backend application. For example, the rate limiting service may determine at block 608 whether the number of API calls processed by each of several gateways servicing a single API, from which the rate limiting service has received several requests for routing instructions exceeds the total maximum number of calls the backend application may process over a preset period of time. If the rate limiting service determines the rate limit has been exceeded, the method may proceed to block 610 for rejection of the requested call. If the rate limiting service determines the rate limit has not been exceeded, the method may proceed to block 614 for routing of the requested call to the backend application. This may assist in avoidance of shutting down a backend service such as a purchase order system or store locator system during a burst in activity, such as with a release of a popular product.

At block 610, the rate limiting service may transmit an instruction to the gateway to reject the requested API call in an embodiment in which the rate limit has been exceeded. In some embodiments, the rate limiting service may transmit such an instruction directly to the gateway requesting routing policies. In other embodiments, the rate limiting service may transmit such an instruction to the gateway requesting routing policies via the SLA monitor.

The gateway receiving the API call request from the external agent in an embodiment may reject the API call at block 612. In an embodiment, the gateway may have received the instruction from the rate limiting service to reject the API call. Such a rejection in an embodiment may take the form of the gateway allowing the API call request to time out. In other embodiments, the gateway may transmit a message to the external agent indicating the requested API call has been rejected. The method may then end for an embodiment in which the external agent has exceeded the rate limit.

At block 614, the API service control plane system in an embodiment in which the rate limit has not been exceeded may retrieve the routing instructions for routing received API calls from the metadata repository. In other embodiments, the routing instructions may be stored at the API service control plane system itself.

The API service control plane system in an embodiment may transmit the routing instructions to the requesting gateway at block 616. The routing instructions in an embodiment may identify a resource path, an address, or location at the backend application the API receiving the API call request services. In the absence of this routing instruction, the gateway may not be capable of making the requested call on the backend application for data stored there.

At block 618, the gateway receiving the routing instructions in an embodiment may route the requested API call. The API call requested by the external agent for retrieving data stored at the backend application may be routed to a specific resource path, address, or location of the backend application. This resource path, address, or location may be specified by the routing instructions received from the API service control plane system.

The backend application serviced by the API executing at the gateway may transmit a response to the API call at block 620. Such a response in an embodiment may include the requested data stored at the backend application. As described herein, the API operating at the gateway may operate as an intermediary between the external agent requesting information from the backend application and the backend application itself. The API may be managed in this way via services at the API service control plane system for this and other API policy enforcement platform types at multiple gateways. If the API determines the external agent requesting the data at the backend application has the credentials to access such data, and all other policies are met (e.g., rate limiting, maximum message size, etc.), the API may retrieve the requested data from the backend application. In embodiments described herein, some portion or all of these tasks (e.g., policy enforcement, rate limiting, authentication) previously associated with the API executing at the gateway may be executed in the API service control plane system of the API lifecycle management system.

At block 622, in an embodiment in which the API executing at the gateway successfully retrieves data from the backend application, the API may transmit the data retrieved from the backend application to the external agent. In such a way, the API executing at the gateway, in tandem with various services of the API service control plane system, may ensure only authenticated, secure external agents in compliance with high-level gateway operation policies may access data stored at the backend application. The method may then end.

The blocks of the flow diagrams 5-6 discussed above need not be performed in any given or specified order and may be executed as code instructions at one or a plurality of processors during preparation and set up of a modeled integration process or of a deployed integration process as described herein. It is contemplated that additional blocks, steps, or functions may be added, some blocks, steps or functions may not be performed, blocks, steps, or functions may occur contemporaneously, and blocks, steps or functions from one flow diagram may be performed within another flow diagram. Further, those of skill will understand that additional blocks or steps, or alternative blocks or steps may occur within the flow diagrams discussed for the algorithms above.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operating a serverless elastic-scale application programming interface (API) gateway management system comprising:
   a network interface device receiving user-specified gateway operation policies for execution of an API at a user-selected gateway, including a service level agreement (SLA) setting in a first format;
   a processor of an API service control plane system generating an initial gateway configuration file in a second format via a first gateway type policy translator selected from a plurality of gateway type policy translators, the initial gateway configuration file instructing the user-selected gateway to provision the API at an initial preset number of nodes to meet the user-specified gateway operation policies;
   the network interface device transmitting the initial gateway configuration file to the user-selected gateway;
   a rate limiting service tracking an external agent call rate at which an external agent makes calls to the API at the user-selected gateway;
   the network interface device receiving an indication that the external agent has made a new call to the API at the user-selected gateway;
   a service level agreement (SLA) monitor service determining the external agent call rate tracked at the rate limiting service exceeds a preset rate limit defined within the user-specified gateway operation policies by the SLA setting; and
   the SLA monitor service transmitting an instruction to the user-selected gateway to reject the new call to the API.

2. The information handling system of claim 1, wherein the user-specified gateway operation policies include a gateway node availability value indicating required capability of the initial preset number of nodes at the user-selected gateway to process calls to the API.

3. The information handling system of claim 1, wherein the user-specified gateway operation policies and the initial gateway configuration file include a maximum message size.

4. The information handling system of claim 1, wherein the user-specified gateway operation policies and the initial gateway configuration file include a quota limit.

5. The information handling system of claim 1 further comprising:
   the SLA monitor service monitoring a number of processed API calls routed by the user-selected gateway over time according to the initial gateway configuration file;
   the SLA monitor determining the number of processed API calls does not meet the SLA setting within the gateway operation policies;
   a processor generating an updated gateway configuration file instructing the user-selected gateway to provision the API at an updated preset number of nodes that is greater than the initial preset number of nodes; and
   the network interface device transmitting the updated gateway configuration file to the user-selected gateway.

6. The information handling system of claim 5 further comprising:
   the network interface device receiving an adjusted gateway operation policy adjusting the gateway node availability value; and
   wherein the adjusted gateway operation policy comprises the most recently updated gateway operation policies.

7. The information handling system of claim 5 further comprising:
   the SLA monitor service determining provisioning the API at the updated preset number of nodes meets cost requirements defined within the user-specified gateway operation policies.

8. A method for managing a serverless elastic-scale application programming interface (API) gateway comprising:
   receiving initial user-specified gateway operation policies for execution of an API at a user-selected gateway, including an initial service level agreement (SLA) setting in a first format, via a network interface device;
   generating, via a processor of an API service control plane system, an initial gateway configuration file in a second format via a first gateway type policy translator selected from a plurality of gateway type policy translators, the initial gateway configuration file instructing the user-selected gateway to provision the API at an initial preset number of nodes to meet the initial SLA setting within the user-specified gateway operation policies;
   transmitting the initial gateway configuration file to the user-selected gateway;
   monitoring, via a service level agreement (SLA) monitor service, a number of processed API calls routed by the user-selected gateway over time, according to the initial gateway configuration file having the initial SLA setting;
   determining the number of processed API calls routed by the user-selected gateway over time does not meet an initial call processing availability requirement preset within the initial SLA setting;
   generating a first updated gateway configuration file instructing the user-selected gateway to provision the API at a first updated preset number of nodes that is greater than the initial preset number of nodes; and
   transmitting the first updated gateway configuration file to the user-selected gateway.

9. The method of claim 8 further comprising:
   receiving an adjusted gateway operation policy, including an updated SLA setting adjusting the gateway node availability value;
   determining the number of processed API calls routed by the user-selected gateway over time does not meet an updated call processing availability requirement preset within the updated SLA setting;

generating a second updated gateway configuration file instructing the user-selected gateway to provision the API at a second updated preset number of nodes that is greater than the first updated preset number of nodes; and transmitting the second updated gateway configuration file to the user-selected gateway.

10. The method of claim 8 further comprising:

the SLA monitor service determining a burst condition preset within the user-specified gateway operation policies has been met.

11. The method of claim 8 further comprising:

transmitting machine executable code instructions for the API to the user-selected gateway, via the network interface device.

12. The method of claim 8 further comprising:

a rate limiting service tracking an external agent call rate at which an external agent makes calls to the API at the user-selected gateway; and the network interface device receiving an indication that the external agent has made a new call to the API at the user-selected gateway.

13. The method of claim 12 further comprising:

the SLA monitor service determining the external agent call rate tracked at the rate limiting service exceeds a preset rate limit defined within the user-specified gateway operation policies; and the SLA monitor service transmitting an instruction to the user-selected gateway to reject the new call to the API.

14. The method of claim 12 further comprising:

an SLA monitor service determining the external agent call rate tracked at the rate limiting service falls below a preset rate limit defined within the user-specified gateway operation policies; and the SLA monitor service transmitting an instruction to the user-selected gateway to process the new call to the API.

15. An information handling system operating a serverless elastic-scale application programming interface (API) gateway management system comprising:

a network interface device receiving user-specified gateway operation policies for execution of an API at a user-selected gateway, including a service level agreement (SLA) setting in a first format;

a processor of an API service control plane system generating a gateway configuration file in a second format via a first gateway type policy translator selected from a plurality of gateway type policy translators, the initial gateway configuration file instructing the user-selected gateway to provision the API at a preset number of nodes to meet the user-specified gateway operation policies;

the network interface device transmitting the gateway configuration file to the user-selected gateway;

a rate limiting service tracking an external agent call rate at which an external agent makes calls to the API at the user-selected gateway;

the network interface device receiving an indication that the external agent has made a new call to the API at the user-selected gateway;

a service level agreement (SLA) monitor service determining the external agent call rate tracked at the rate limiting service falls below a preset rate limit defined within the user-specified gateway operation policies; and the SLA monitor service transmitting an instruction to the user-selected gateway to process the new call to the API.

16. The information handling system of claim 15 further comprising:

the network interface device transmitting routing instructions identifying a resource path for processing the new call to a mesh controller operating in tandem with the user-selected gateway.

17. The information handling system of claim 15 further comprising:

the network interface device transmitting to the user-selected gateway routing instructions identifying a resource path for processing the new call.

18. The information handling system of claim 17, wherein the routing instructions comprise the instruction to the user-selected gateway to process the new call to the API.

19. The information handling system of claim 15, wherein the user-specified gateway operation policies include a gateway node availability value indicating required capability of the preset number of nodes at the user-selected gateway to process calls to the API.

20. The information handling system of claim 15 further comprising:

the network interface device transmitting the gateway configuration file to a mesh controller operating in tandem with the user-selected gateway.

* * * * *